(12) United States Patent
Otsuka et al.

(10) Patent No.: US 11,972,365 B2
(45) Date of Patent: Apr. 30, 2024

(54) QUESTION RESPONDING APPARATUS, QUESTION RESPONDING METHOD AND PROGRAM

(71) Applicant: NIPPON TELEGRAPH AND TELEPHONE CORPORATION, Tokyo (JP)

(72) Inventors: Atsushi Otsuka, Musashino (JP); Kyosuke Nishida, Musashino (JP); Itsumi Saito, Musashino (JP); Kosuke Nishida, Musashino (JP); Hisako Asano, Musashino (JP); Junji Tomita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 734 days.

(21) Appl. No.: 16/972,187

(22) PCT Filed: Apr. 25, 2019

(86) PCT No.: PCT/JP2019/017805
§ 371 (c)(1),
(2) Date: Dec. 4, 2020

(87) PCT Pub. No.: WO2019/235103
PCT Pub. Date: Dec. 12, 2019

(65) Prior Publication Data
US 2021/0232948 A1 Jul. 29, 2021

(30) Foreign Application Priority Data
Jun. 7, 2018 (JP) .................................. 2018-109765
Nov. 14, 2018 (JP) .................................. 2018-214187

(51) Int. Cl.
*G06F 16/2453* (2019.01)
*G06F 16/903* (2019.01)
(Continued)

(52) U.S. Cl.
CPC .......... *G06N 5/04* (2013.01); *G06F 16/24534* (2019.01); *G06F 16/90335* (2019.01); *G06N 20/00* (2019.01)

(58) Field of Classification Search
CPC ........ G06F 16/24534; G06F 16/90335; G06N 5/04; G06N 20/00
See application file for complete search history.

(56) References Cited

U.S. PATENT DOCUMENTS 9,152,698 B1 * 10/2015 Dhamdhere .......... G06F 16/332
2012/0173560 A1 * 7/2012 Chowdhury .......... G06F 16/954
707/E17.014
(Continued)

OTHER PUBLICATIONS

M. Seo, A. Kembhavi, A. Farhadi, and H. Hajishirzi, "Bidirectional attention flow for machine comprehension", In ICLR, Feb. 24, 2017.
(Continued)

*Primary Examiner* — Beau D Spratt
(74) *Attorney, Agent, or Firm* — IPUSA, PLLC

(57) ABSTRACT

A question generation device includes: generating means which uses a query and a relevant document including an answer to the query as input and, using a machine learning model having been learned in advance, generates a revised query in which a potentially defective portion of the query is supplemented with a word included in a prescribed lexical set.

12 Claims, 17 Drawing Sheets

(51) Int. Cl.
   *G06N 5/04*    (2023.01)
   *G06N 20/00*   (2019.01)

(56) References Cited

U.S. PATENT DOCUMENTS

2017/0300530 A1* 10/2017 Tang ................. G06F 16/24578
2018/0341871 A1* 11/2018 Maitra .................. G06N 3/042
2019/0197158 A1*  6/2019 Firooz .................. G06F 16/313

OTHER PUBLICATIONS

Atsushi Otsuka, Kyosuke Nishida, Itsumi Saito, Hisako Asano, Junji Tomita, "Neural Question Generation Model for Identifying Intent of Question", DEIM Forum, Mar. 1, 2018.

* cited by examiner

Fig. 12

RELEVANT DOCUMENT

THE YEN EXCHANGE RATE AS OF 5 P.M. WAS 109.74 TO 109.75 TO THE DOLLAR, A RISE OF 0.26 YEN AGAINST THE DOLLAR AS COMPARED TO LAST WEEKEND. THE YEN EXCHANGE RATE WAS 129.57 TO 129.61 TO THE EURO, A FALL OF 0.64 YEN AGAINST THE EURO AS COMPARED TO LAST WEEKEND. THE EURO WAS 1.1807 TO 1.1808 TO THE DOLLAR. MARKET SOURCES SAY "WARINESS OVER THE ESCALATING CONFLICT BETWEEN THE US AND NORTH KOREA PROMPTED AGGRESSIVE BUYING OF YEN, CONSIDERED A RELATIVELY SAFE CURRENCY, AND SELLING OF DOLLARS AS A RISK AVOIDANCE MEASURE, AND THE YEN TEMPORARILY ROSE AGAINST THE DOLLAR TO THE LOWER 109 YEN RANGE, WHILE SUBSEQUENT DOLLAR-BUYING LIMITED THE YEN'S RISE AS A WHOLE TO A MARGINAL LEVEL. THE MARKET REMAINS WARY".

INPUT QUESTION

WHAT WAS THE YEN EXCHANGE RATE AS OF 5 P.M.?

REVISED QUESTION 1

WHAT WAS THE YEN EXCHANGE RATE AGAINST THE DOLLAR AS OF 5 P.M.?

REVISED QUESTION 2

WHAT WAS THE YEN EXCHANGE RATE AGAINST THE EURO AS OF 5 P.M.?

ANSWER 1

109.74 TO 109.75 TO THE DOLLAR, A RISE OF 0.26 YEN AGAINST THE DOLLAR AS COMPARED TO LAST WEEKEND

ANSWER 2

129.57 TO 129.61 TO THE EURO, A FALL OF 0.64 YEN AGAINST THE EURO AS COMPARED TO LAST WEEKEND

QUESTION RESPONDING APPARATUS, QUESTION RESPONDING METHOD AND PROGRAM

TECHNICAL FIELD

The present invention relates to a question generation device, a question generation method, and a program.

BACKGROUND ART

In recent years, question answering techniques are gaining attention in which a computer automatically answers a question input by a user in a natural language on a device such as a smartphone or a smart speaker. As such a question answering technique, a machine comprehension-type question answering technique is known in which, with respect to a question input in a natural language, a portion to be used as an answer is extracted from a document described in a natural language in a same manner (for example, refer to NPL 1).

In a machine comprehension-type question answering technique, it is known that a neural network is used to collate a question with an answer portion described in a document such as a manual to achieve an answer accuracy that is comparable to or higher than that of a person.

CITATION LIST

Non Patent Literature

[NPL 1] M. Seo, A. Kembhavi, A. Farhadi, and H. Hajishirzi. 2017. Bidirectional attention flow for machine comprehension. In ICLR.

SUMMARY OF THE INVENTION

Technical Problem

In order to achieve a high answer accuracy in a machine comprehension-type question answering technique, it is required that question contents be clear and, at the same time, information necessary to form an answer be included in the question without lack. However, in actual services using a machine comprehension-type question answering technique, there are cases where question contents are ambiguous or a query is too short. In such a case, there is a possibility that an answer to a question cannot be uniquely determined or answer contents may end up being erroneous and, consequently, high answer accuracy cannot be achieved.

An embodiment of the present invention has been made in consideration of the points described above and an object thereof is to achieve high answer accuracy with respect to a question.

Means for Solving the Problem

In order to achieve the object described above, a question generation device in an embodiment of the present invention includes: generating means which uses a query and a relevant document including an answer to the query as input and, using a machine learning model having been learned in advance, generates a revised query in which a potentially defective portion of the query is supplemented with a word included in a prescribed lexical set.

Effects of the Invention

High answer accuracy with respect to a question can be achieved.

BRIEF DESCRIPTION OF DRAWINGS

FIG. 12 is a diagram for explaining an example of a revised question according to a second embodiment of the present invention.

DESCRIPTION OF EMBODIMENT

Figure 1:
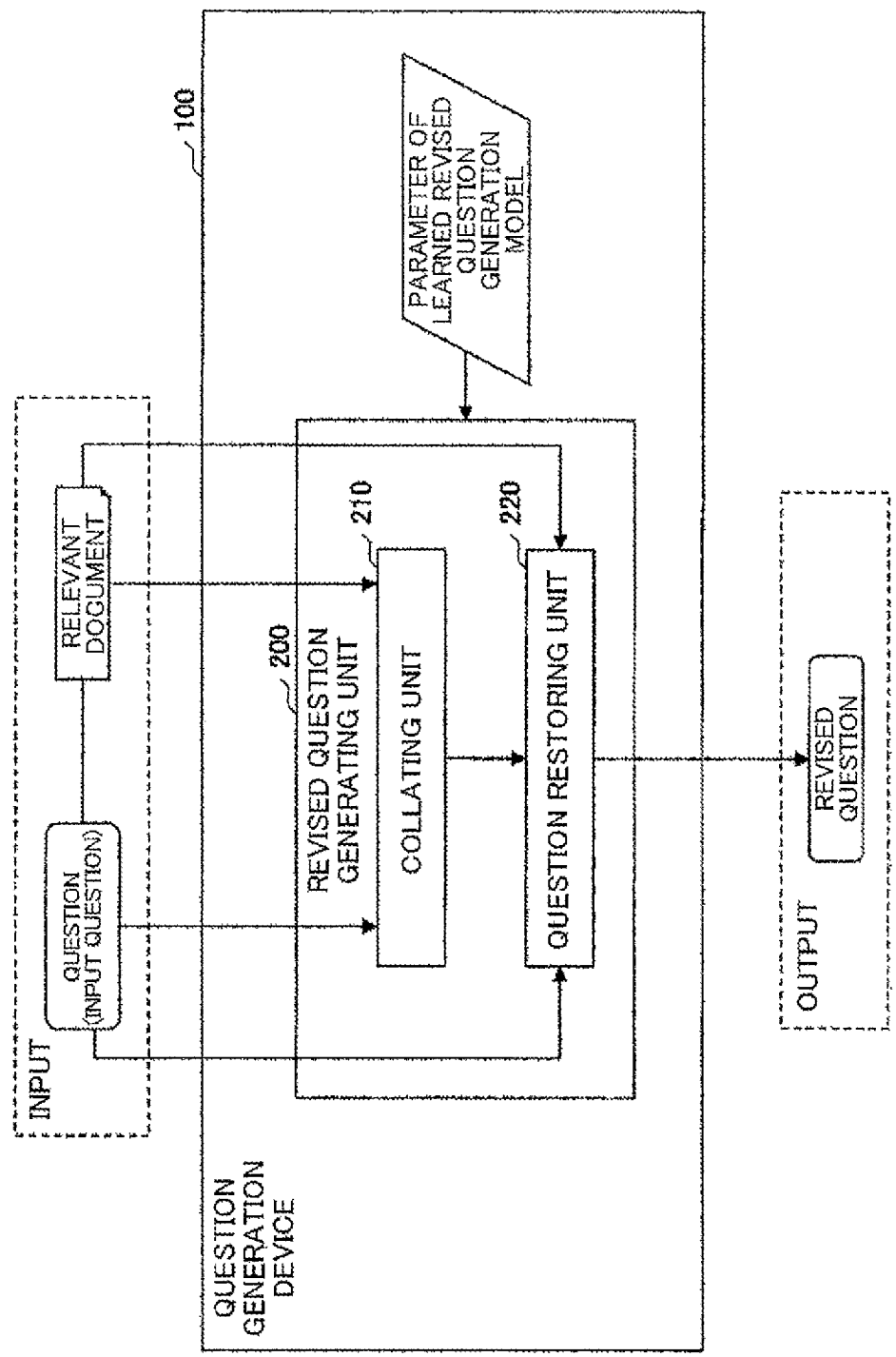
FIG. 1 is a diagram showing an example of a functional configuration of a question generation device during revised question generation according to a first embodiment of the present invention.

Hereinafter, each embodiment of the present invention will be described in detail with reference to the drawings. A question generation device 100 which, for the purpose of improving an answer accuracy of question answering using a machine comprehension-type question answering technique, generates a revised question (RQ) of a question having been input (hereinafter, also simply described an "input question") will be described below. A revised question refers to a query which is obtained by reinforcing question contents of an input question and which contains more specific contents. In other words, a revised question refers to a question of which question contents are clear and which includes information necessary to form an answer without lack.

By generating a revised question of a question prior to a task (a question answering task) of generating and giving an answer to the question and then performing the question answering task using the revised question, an answer accuracy of question answering can be improved.

It should be understood that the respective embodiments described below are simply examples and that modes to which the present invention is applicable are not limited to the following embodiments. While techniques related to the respective embodiments of the present invention can be used in, for example, services and the like which provide an answer with respect to a question input by a user in a natural language, objects of use are not limited thereto and the techniques can be used in various objects.

First Embodiment

First, a first embodiment of the present invention will be described.

(Outline)

In the first embodiment of the present invention, in a case where an input question and a document related to the input question (hereinafter, also referred to as a "relevant document") are given, the question generation device 100 uses a machine learning model for generating a revised question (hereinafter, also referred to as a "revised question generation model") to generate a revised question of the input question.

More specifically, in the first embodiment of the present invention, a revised question is generated by using a revised question generation model to match the input question and the relevant document with each other and supplementing a potentially-defective portion (a character string such as a word or a clause) of the input question. Accordingly, for example, when an input question of which question contents are ambiguous or an input question of which a query is too short is given, a revised question that is more elaborated or more substantiated than the input question is generated. In addition, at this point, the generation of the revised question using the relevant document enables, for example, a revised question to which a system performing a question answering task can answer to be generated (in other words, a revised question to which the system performing a question answering task cannot answer can be prevented from being generated).

In addition, in the first embodiment of the present invention, a revised question generation model is learned using an input question to be used as correct-answer data, a question created by omitting a part of the input question (this question is also referred to as a "defective question"), and a relevant document. In the learning, a parameter of the revised question generation model is updated so that a natural sentence obtained using the defective question and the relevant document approaches the input question that is correct-answer data. The defective question refers to, as a query related to the input relevant document, a query in which a part of necessary information (a character string such as a word or a clause) is defective. It should be noted that a natural sentence refers to a sentence described in a natural language.

In this case, in the first embodiment of the present invention, it is assumed that the input question is a sentence described in a natural language (in other words, a natural sentence) and, for example, by performing a morphological analysis or the like, the input question can be expressed as a set Q of J-number of word tokens, where $Q=\{q_0, q_1, \ldots, q_{J-1}\}$. In addition to a natural sentence, the sentence to be an input question may be, for example, simply an enumeration of keywords. Alternatively, the sentence may be obtained as a speech recognition result or the like.

Furthermore, it is assumed that the relevant document is a sentence constituted by, for example, around several hundred words and expressed as a set X of T-number of word tokens, where $X=\{x_0, x_1, \ldots, x_{T-1}\}$. In this case, it is assumed that the relevant document includes information to be an answer to the input question. Examples of the relevant document include a manual or the like in which an answer to the input question is described. In the first embodiment of the present invention, a relevant document is also referred to as a passage.

Moreover, it is assumed that the revised question is a sentence that is more elaborated or more substantiated than the input question and expressed as a set RQ of S-number of word tokens, where $RQ=\{y_0, y_1, \ldots, y_{S-1}\}$.

(Functional Configuration of Question Generation Device 100)

First, a functional configuration of the question generation device 100 during revised question generation according to the first embodiment of the present invention will be described with reference to FIG. 1. FIG. 1 is a diagram showing an example of a functional configuration of the question generation device 100 during revised question generation according to the first embodiment of the present invention.

As shown in FIG. 1, the question generation device 100 during revised question generation according to the first embodiment of the present invention has a revised question generating unit 200. The revised question generating unit 200 is realized by a learned revised question generation model (in other words, a revised question generation model using a parameter that has been updated by a revised question generation model learning unit 400 to be described later).

The revised question generating unit 200 uses a question (an input question) and a relevant document as input and generates and outputs a revised question. More specifically, the revised question generating unit 200 regards the input question to be a defective question and generates the revised question by restoring, using the relevant document, a query prior to becoming defective.

In this case, the revised question generating unit 200 includes a collating unit 210 and a question restoring unit 220. The collating unit 210 generates matching information between the input question and the relevant document. Matching information refers to information representing a matching relation between each word included in the input question and each word included in the relevant document. The question restoring unit 220 generates (restores), using the matching information generated by the collating unit 210, the input question, and the relevant document, a natural sentence so that the input question becomes the query prior to becoming defective. The natural sentence generated by the question restoring unit 220 is adopted as a revised question.

Figure 2:
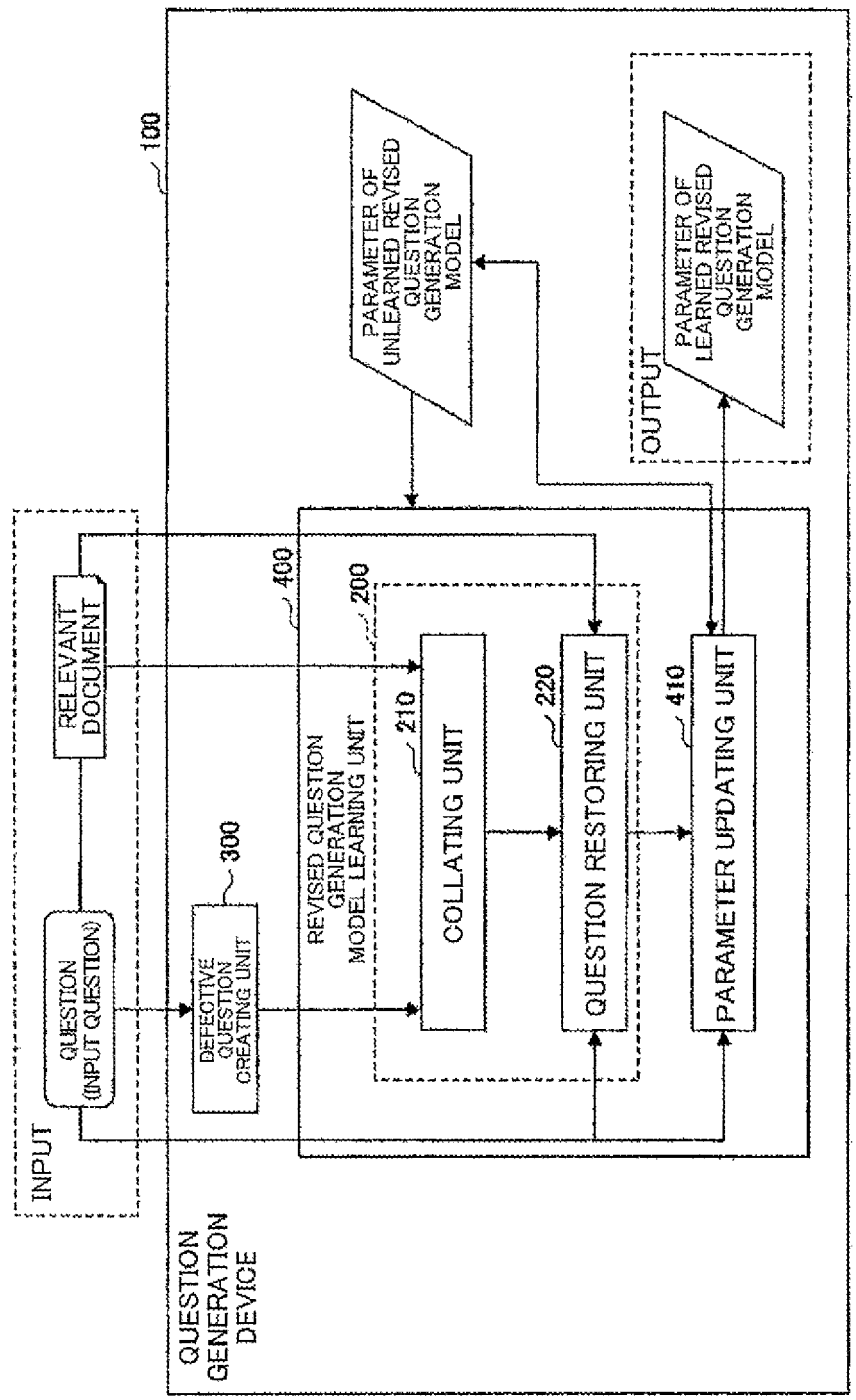
FIG. 2 is a diagram showing an example of a functional configuration of the question generation device during learning according to the first embodiment of the present invention.

Next, a functional configuration of the question generation device 100 during learning according to the first embodiment of the present invention will be described with reference to FIG. 2. FIG. 2 is a diagram showing an example of the functional configuration of the question generation device 100 during learning according to the first embodiment of the present invention.

As shown in FIG. 2, the question generation device 100 during learning according to the first embodiment of the present invention has a defective question creating unit 300 and the revised question generation model learning unit 400.

The defective question creating unit 300 creates a defective question by inputting a question (an input question) and omitting a part of the input question.

The revised question generation model learning unit 400 learns a revised question generation model using the defective question created by the defective question creating unit 300, the input question, and the relevant document. In addition, the revised question generation model learning unit 400 outputs a parameter of the learned revised question generation model.

In this case, the revised question generation model learning unit 400 includes the collating unit 210, the question restoring unit 220, and a parameter updating unit 410. The collating unit 210 and the question restoring unit 220 are as described above. After calculating an error between the natural sentence (the revised question) generated by the question restoring unit 220 and the input question, the parameter updating unit 410 uses the error to update a parameter of the revised question generation model (a parameter of an unlearned revised question generation model) according to an arbitrary optimization method. As the parameter is updated by the parameter updating unit 410, the revised question generation model is learned.

In the first embodiment of the present invention, it is assumed that the revised question generation model is a machine learning model that is realized by a neural network. However, all of or a part of the revised question generation model may be realized by a machine learning model other than a neural network. For example, at least one functional unit among the collating unit 210 and the question restoring unit 220 may be realized by a machine learning model other than a neural network.

(Hardware Configuration of Question Generation Device 100)

Figure 3:
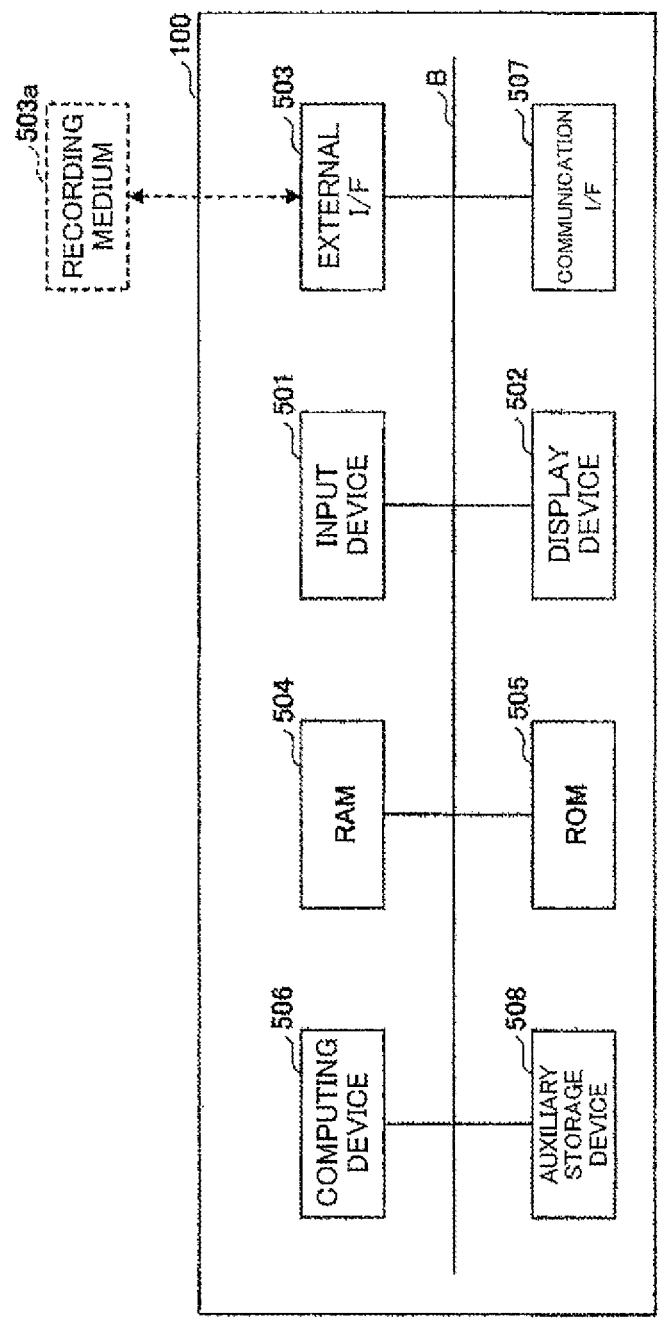
FIG. 3 is a diagram showing an example of a hardware configuration of the question generation device according to the first embodiment of the present invention.

Next, a hardware configuration of the question generation device 100 according to the first embodiment of the present invention will be described with reference to FIG. 3. FIG. 3 is a diagram showing an example of the hardware configuration of the question generation device 100 according to the first embodiment of the present invention.

As shown in FIG. 3, the question generation device 100 according to the first embodiment of the present invention has an input device 501, a display device 502, an external I/F 503, a RAM (Random Access Memory) 504, a ROM (Read Only Memory) 505, a computing device 506, a communication I/F 507, and an auxiliary storage device 508. Each of the pieces of hardware is connected via a bus B so as to be capable of communication.

The input device 501 is, for example, a keyboard, a mouse, or a touch panel that is used by a user to input various operations. The display device 502 is, for example, a display that displays a processing result (for example, a revised question or the like) of the question generation device 100. It should be noted that the question generation device 100 may not have at least one of the input device 501 and the display device 502.

The external I/F 503 is an interface with external devices. The external devices include a recording medium 503a. The question generation device 100 is capable of reading from and writing into the recording medium 503a or the like via the external I/F 503. The recording medium 503a may record one or more programs and the like which realize each functional unit of the question generation device 100.

Examples of the recording medium 503a include a flexible disk, a CD (Compact Disc), a DVD (Digital Versatile Disk), an SD memory card (Secure Digital memory card), a USB (Universal Serial Bus) memory card, and the like.

The RAM 504 is a volatile semiconductor memory that temporarily holds programs and data. The ROM 505 is a nonvolatile semiconductor memory that is capable of holding programs and data even after power is turned off. The ROM 505 stores, for example, settings related to an OS (Operating System), settings related to a communication network, and the like.

The computing device 506 is, for example, a CPU (Central Processing Unit), a GPU (Graphics Processing Unit), or the like for reading programs and data from the ROM 505, the auxiliary storage device 508, and the like to the RAM 504 to execute processing. Each functional unit included in the question generation device 100 is realized by, for example, processing which the one or more programs stored in the auxiliary storage device 508 causes the computing device 506 to execute. It should be noted that, as the computing device 506, the question generation device 100 may have both the CPU and the GPU or only one of the CPU and the GPU.

The communication I/F 507 is an interface for connecting the question generation device 100 to a communication network. The one or more programs which realize each functional unit of the question generation device 100 may be acquired (downloaded) from a prescribed server apparatus or the like via the communication I/F 507.

The auxiliary storage device 508 is, for example, a nonvolatile storage device storing programs and data such as an HDD (Hard Disk Drive) or an SSD (Solid State Drive). Examples of the programs and data stored in the auxiliary storage device 508 include an OS and the one or more programs and the like which realize each functional unit of the question generation device 100.

By having the hardware configuration shown in FIG. 3, the question generation device 100 according to the first embodiment of the present invention is capable of realizing the various types of processing to be described later. While a case where the question generation device 100 according to the first embodiment of the present invention is realized by a single apparatus (computer) has been described using the example shown in FIG. 3, the question generation device 100 is not limited thereto. The question generation device 100 according to the first embodiment of the present invention may be realized by a plurality of apparatuses (computers). In addition, the question generation device 100 according to the first embodiment of the present invention may be realized by an apparatus (a computer) that is equipped with a plurality of computing devices 506 and a plurality of memories (the RAM 504, the ROM 505, the auxiliary storage device 508, and the like).

(Generation Processing of Revised Question)

Figure 4:
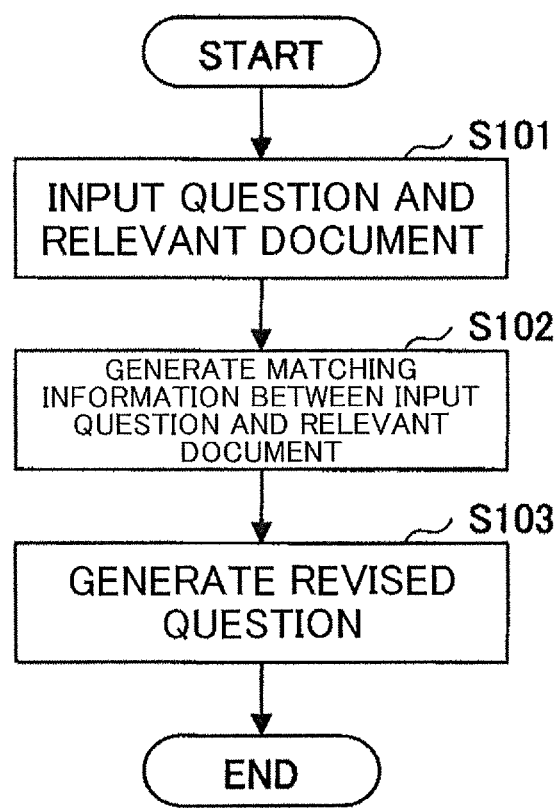
FIG. 4 is a flow chart showing an example of generation processing of a revised question according to the first embodiment of the present invention.

Next, generation processing of a revised question according to the first embodiment of the present invention will be described with reference to FIG. 4. FIG. 4 is a flow chart showing an example of the generation processing of a revised question according to the first embodiment of the present invention. In the generation processing of a revised question, it is assumed that a revised question generation model that realizes the revised question generating unit 200 has already been learned.

Figure 5:
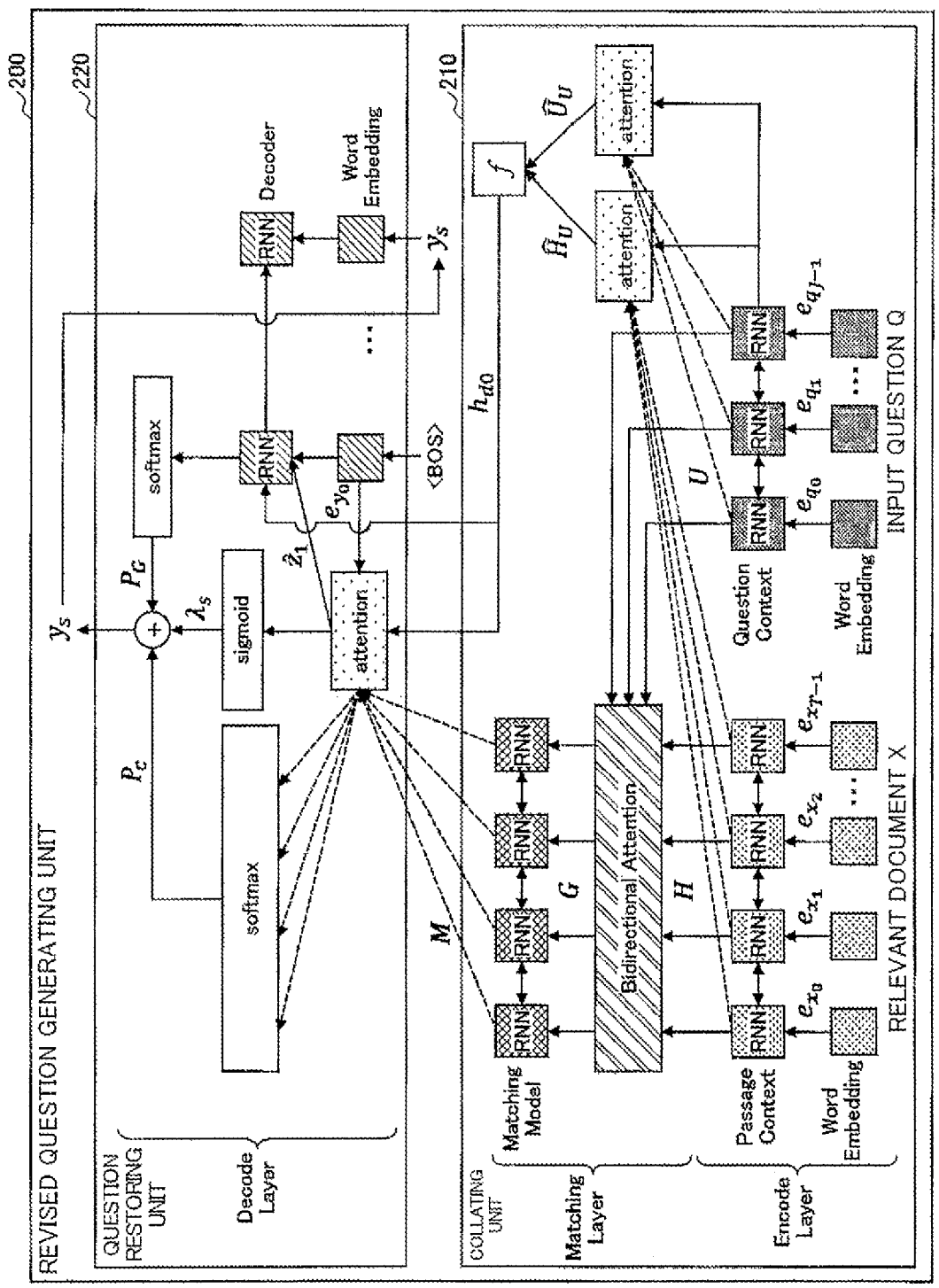
FIG. 5 is a diagram showing an example of a case where a revised question generation model according to the first embodiment of the present invention is realized by a neural network.

An example of the revised question generation model that realizes the revised question generating unit 200 according to the first embodiment of the present invention is shown in FIG. 5. As shown in FIG. 5, in the first embodiment of the present invention, the revised question generation model is a neural network constituted by three layers, namely, an Encode Layer, a Matching Layer, and a Decode Layer. Among these layers, the Encode Layer and the Matching Layer realize the collating unit 210. In addition, the Decode Layer realizes the question restoring unit 220. In the following generation processing of a revised question, detailed processing of each layer will also be described with reference to the revised question generation model shown in FIG. 5.

The Encode Layer and the Decode Layer are layers based on Seq2Seq that is a language generation model. On the other hand, the Matching Layer is a layer based on an Attention Flow Layer and a Modeling Layer which are used in a machine comprehension task. For details of Seq2Seq, for example, refer to Reference 1 and Reference 2 below. In addition, for details of a comprehension task, for example, refer to Reference 3 below.

[Reference 1] I. Sutskever, O. Vinyals, and Q. V. Le. Sequence to sequence learning with neural networks. Proc of the 27th International Conference on Neural Information Processing Systems (NIPS2014), pp. 3104-3112, 2014.

[Reference 2] O. Vinyals and Q. V. Le. A neural conversational model. Proc of the ICML Deep Learning Workshop 2015, 2015.

[Reference 3] M. J. Seo, A. Kembhavi, A. Farhadi, and H. Hajishirzi. Bidirectional attention flow for machine comprehension. Proc of 5th International Conference on Learning Representations (ICLR2017), 2017.

Step S101: The revised question generating unit 200 inputs a question (an input question) Q and a relevant document X.

Step S102: The collating unit 210 of the revised question generating unit 200 generates, through steps S102-1 to S102-4 below, as matching information, a hidden state vector $h_{d0}$ to be adopted as an initial state of a Decoder and a matching matrix M that is a matching model to be used in a machine comprehension task.

Step 102-1: First, as processing of Word Embedding in the Encode Layer of the revised question generation model shown in FIG. 5, the collating unit 210 respectively converts the relevant document X and the input question Q into d-dimensional word vector sequences. In other words, the collating unit 210 creates word vector sequences by vectorizing each word token that constitutes each of the relevant document X and the input question Q.

Assuming that the word vector sequence of the relevant document X is also to be represented by X, the word vector sequence X of the relevant document X is expressed as follows.

$$X = \{e_{x_0}, e_{x_1}, \ldots, e_{x_{T-1}}\} \quad \text{[Formula 1]}$$

In addition, assuming that the word vector sequence of the input question Q is also to be represented by Q, the word vector sequence Q of the input question Q is expressed as follows.

$$Q = \{e_{q_0}, e_{q_1}, \ldots, e_{q_{J-1}}\} \quad \text{[Formula 2]}$$

While the word vector sequences X and Q are created from the input question Q and the relevant document X which have been input in the first embodiment of the present invention, processing is not limited thereto and, for example, the word vector sequences X and Q may be input in step S101 described above.

Step S102-2: Next, as processing of a Passage Context in the Encode Layer of the revised question generation model shown in FIG. 5, the collating unit 210 encodes the word vector sequence X by an RNN (Recurrent Neural Network) to obtain a context matrix $H \in R^{2d \times T}$ of the relevant document X. It should be noted that a column vector constituted by elements of a t-th column of the context matrix H will be referred to as a context vector $H_t$.

In a similar manner, as processing of a Question Context in the Encode Layer of the revised question generation model shown in FIG. 5, the collating unit 210 encodes the word vector sequence Q by an RNN to obtain a context matrix $U \in R^{2d \times J}$ of the input question Q. It should be noted that a column vector constituted by elements of a j-th column of the context matrix U will be referred to as a context vector $U_j$.

In this case, the RNNs used in the processing of the Passage Context and the Question Context may be, for example, bi-RNN, LSTM (Long Short Term Memory), bi-LSTM, or the like. However, the RNN used in the processing of the Passage Context and the RNN used in the processing of the Question Context are to use a common parameter.

Step S102-3: Next, as processing of the Matching Layer of the revised question generation model shown in FIG. 5, the collating unit 210 generates the hidden state vector $h_{d0}$ to be adopted as an initial state of a Decoder according to a procedure described below.

First, using an attention mechanism (attention), with respect to the context vector $U_{J-1}$ and the context matrix H, the collating unit 210 calculates an attention vector $\hat{H}_U \in R^{2d}$ with the relevant document X according to Expressions (1) and (2) below. For convenience of description of the specification, "X to which ˆ is added as a superscript" (in other words, X to which "ˆ" is added as a diacritic) will be notated as "Xˆ".

[Formula 3]

$$\alpha_t = \text{softmax}_t(H_t^\tau \cdot U_{J-1}) \quad (1)$$

$$\hat{H}_U = \sum_t \alpha_t H_t, \quad (2)$$

where τ denotes transposition. In addition, $\text{softmax}_t$ denotes a t-th output of a softmax function. It should be noted that "U" notated as a subscript in $\hat{H}_U$ in Expression (2) above is not a suffix.

In a similar manner, using an attention mechanism (attention), with respect to the context vector $U_{J-1}$ and the context matrix U, the collating unit 210 calculates an attention vector $\hat{U}_U \in R^{2d}$ with the input question Q according to Expressions (3) and (4) below.

[Formula 4]

$$\alpha'_j = \text{softmax}_j(U_j^\tau \cdot U_{J-1}) \quad (3)$$

$$\hat{U}_U = \sum_j \alpha'_j U_j, \quad (4)$$

where softmax$_j$ denotes a j-th output of the softmax function. It should be noted that "U" notated as a subscript in U$\hat{}_U$ in Expression (4) above is not a suffix.

This causes attention to be taken by a context of the input question Q itself and prompts important words in the input question Q to be taken into consideration.

Subsequently, using the two attention vectors H$\hat{}_U$ and U$\hat{}_U$ respectively calculated by Expressions (2) and (4) above, the collating unit 210 calculates the hidden state vector $h_{d0}$ to be adopted as an initial state of a Decoder according to Expression (5) below.

[Formula 5]

$$h_{d0} = f(W_m[\hat{H}_U; \hat{U}_U] + b_m) \quad (5)$$

where $w_m \in R^{4d \times 2d}$ and $b_m \in R^{2d}$ are parameters. In addition, f denotes an activation function and, for example, Leaky ReLU or the like is used. Moreover, [;] represents concatenation.

Step S102-4: Next, as processing of the Matching Layer of the revised question generation model shown in FIG. 5, the collating unit 210 generates the matching matrix M according to a procedure described below.

First, the collating unit 210 inputs the context matrix H of which a sequence length is T and the context matrix U of which a sequence length is J into an Attention layer. In addition, as processing of the Attention layer, the collating unit 210 calculates a similarity matrix S of words between the relevant document X and the input question Q.

A similarity between a t-th word of the relevant document X and a j-th word of the input question Q is defined as follows:

[Formula 6]

$$S_{tj} = w_s^\tau [H_t; U_j; H_t \odot U_j] \quad (6),$$

where $w_s^\tau \in R^{6d}$ is a parameter. In addition, $$\odot \quad \text{[Formula 7]}$$

represents an element product.

Accordingly, the similarity matrix $S = (S_{tj}) \in R^{T \times J}$ is created.

Next, using the similarity matrix S, the collating unit 210 calculates attention in two directions, namely, attention from the relevant document X to the input question Q and attention from the input question Q to the relevant document X.

In the attention from the relevant document X to the input question Q, with respect to each word in the relevant document X, the collating unit 210 calculates an attention vector having been weighted by a word in the input question Q. In other words, the collating unit 210 calculates an attention vector corresponding to the t-th word in the relevant document X according to Expressions (7) and (8) below.

$$\check{U}_t \in R^{2d}$$

[Formula 9]

$$\beta_{tj} = \text{softmax}_j(S_t) \quad (7)$$

$$\check{U}_t = \sum_j \beta_{tj} U_j \quad (8)$$

In addition, with respect to the attention from the input question Q to the relevant document X, after calculating an attention vector having been weighted by a word with a strong correlation to any of the words in the input question Q, the collating unit 210 creates a matrix in which as many attention vectors as the sequence length T of the relevant document X are arranged. In other words, first, the collating unit 210 calculates the attention vector according to Expressions (9) and (10) below.

$$\check{h}_t \quad \text{[Formula 10]}$$

[Formula 11]

$$\gamma_t = \text{softmax}_t(\max_j(S)) \quad (9)$$

$$\check{h}_t = \sum_{t'} \gamma_{t'} H_t, \quad (10)$$

where $\max_j(S)$ represents a T-dimensional vector having, as an element, a j-th element $S_{tj}$ of a vector $S_t$ having max ($S_t$) with respect to t=1, ..., T-1 (it should be noted that a vector $\gamma$ having each $\gamma_t$ as an element is a T-dimensional vector).

Next, the collating unit 210 creates a matrix in which T-number of the attention vector calculated by the Expression (10) above is arranged.

$$\check{H} = \{\check{h}_0, \check{h}_1, \ldots, \check{h}_{T-1}\} \in R^{2d \times T} \quad \text{[Formula 12]}$$

Subsequently, using the attention vector $H\hat{}_H \in R^{2d \times T}$ representing self-attention taken between a context vector $H_{T-1}$ and the context matrix H, the collating unit 210 calculates an attention matrix G according to Expression (11) below.

[Formula 13]

$$G = [H; \check{U}; H \odot \check{U}; H \odot \check{H}; \hat{H}_H] \in R^{10d \times T} \quad (11)$$

For details of self-attention, for example, refer to Reference 4 below.

[Reference 4] W. Wang, N. Yang, F. Wei, B. Chang, and M. Zhou. Gated self-matching networks for reading comprehension and question answering. Proc of the 55th Annual Meeting of the Association for Computational Linguistics (ACL2017), pp. 189-198, 2017.

Alternatively, the collating unit 210 may calculate the attention matrix G without using the attention vector H$\hat{}_H \in R^{2d}$ (in other words, without concatenating the attention vector H$\hat{}_H$ in Expression (11) above). In this case, the attention matrix G is expressed as $G \in R^{8d \times T}$.

In addition, as processing of a Matching Model in the Encode Layer of the revised question generation model shown in FIG. 5, the collating unit 210 inputs the attention matrix G calculated by Expression (11) above into the RNN to obtain the matching matrix $M \in R^{2d \times T}$.

According to step S102 described above, as matching information, the hidden state vector $h_{d0}$ to be adopted as an initial state of a Decoder and the matching matrix M that is a matching model to be used in a machine comprehension task are generated.

Alternatively, as a method of generating the matching information, any method other than the method described above may be used. In addition, as a form of expression of the matching information, an arbitrary form such as a vector, a matrix, or a tensor may be used. For example, a bag-of-words vector in which an element of a word that is a match between the input question Q and the relevant document X is assigned a value of 1 and an element of other words is assigned a value of 0 may be used or information that takes into consideration not only matches of types of words but also appearance positions of the words in the relevant document X may be used. However, when matching information is expressed solely by a scalar value such as similarity, since information indicating in which portion the input question Q and the relevant document X match each other is omitted, the form of expression of the matching information is preferably not a scalar value.

Step S103: Using the matching information (the hidden state vector $h_{d0}$ and the matching matrix M) generated by the collating unit 210, the input question Q, and the relevant document X, the question restoring unit 220 of the revised question generating unit 200 generates a natural sentence to be a revised question RQ through steps S103-1 to S103-7 described below.

In this case, it is assumed that the natural sentence to be the revised question RQ is constituted by a word $y_s$ (s=0, 1, ... ), where a word $y_0$ represents a token <BOS> that indicates a beginning of a sentence. For example, the question restoring unit 220 generates the revised question RQ by repetitively generating the word $y_s$ in sequence starting from s=1 until a token <EOS> indicating an end of the sentence is generated. In steps S103-1 to S103-7 described below, a case where the word $y_s$ with respect to a given s is generated will be described. In addition, assuming that the RNN that is a Decoder is an LSTM, a hidden state of the LSTM will be denoted by $h_{ds}$ and an initial value of the hidden state (in other words, a hidden state $h_{ds}$ when s=0) will be adopted as the hidden state vector $h_{d0}$ that is calculated by the collating unit 210.

Step 103-1: First, as processing of Word Embedding in the Decode Layer of the revised question generation model shown in FIG. 5, the question restoring unit 220 converts a word $y_{s-1}$ generated in an immediately previous repetition into a word vector $e_{y_{s-1}}$. As described earlier, when s=1 (in other words, in a first repetition), assuming that the word $y_{s-1}=y_0$, the token <BOS> that indicates the beginning of a sentence is converted into a word vector $e_{y_0}$.

Step 103-2: Next, as processing of the Decode Layer of the revised question generation model shown in FIG. 5, using an attention mechanism (attention), the question restoring unit 220 calculates an input $\hat{z}_s \in R^{3d}$ to the LSTM that is a Decoder according to Expressions (12) to (15) below.

[Formula 14]

$$\hat{h}_s = f(W_d[e_{y_{s-1}}; h_{d(s-1)}] + b_d) \quad (12)$$

$$\varepsilon_{st} = \text{softmax}_t(M_t \cdot \hat{h}_s) \quad (13)$$

$$\hat{c}_t = \sum_s \varepsilon_{st} M_t \quad (14)$$

$$\hat{z}_s = [e_{y_{s-1}}; \hat{c}_s], \quad (15)$$

where $W_d \in R^{2d \times 3d}$ and $b_d \in R^{2d}$ are parameters and f denotes an activation function. In addition, $M_t \in R^{2d}$ represents a column vector constituted by elements of a t-th column of the matching matrix M.

Step 103-3: Next, the question restoring unit 220 updates the hidden state $h_{ds}$ of the Decoder according to Expression (16) below.

[Formula 15]

$$h_{ds} \leftarrow \text{LSTM}(h_{d(s-1)}, \hat{z}_s) \quad (16)$$

Step 103-4: Next, as processing of the Decoder in the Decode Layer, the question restoring unit 220 inputs $\hat{z}_s$ obtained by Expression (15) above into the LSTM to calculate a softmax function. Accordingly, a generation probability distribution $P_G (y_s|y_{<s}, X, Q)$ is obtained as an output of the softmax function. The generation probability distribution $P_G (y_s|y_{<s}, X, Q)$ represents, when the words $y_s$ up to an s–1-th word is generated, a distribution of conditional probability that a word included in a given specific lexical set having been set in advance is generated as an s-th word $y_s$. Examples of the specific lexical set include a set constituted by words that frequently appear in a general document and the like.

Step 103-5: Next, as processing in the Decode Layer, using a weight $\varepsilon_{st}$ obtained by Expression (13) above and the softmax function, the question restoring unit 220 calculates a generation probability $P_c (y_s|y_{<s}, X, Q)$ according to Expression (17) below.

[Formula 16]

$$P_c(y_s | y_{<s}, X, Q) = \sum_t I(y_s = x_t)\varepsilon_{st}, \quad (17)$$

where $I (y_s=x_t)$ denotes a function that returns 1 when the generated word $y_s$ matches a t-th word $x_t$ in the relevant document X but otherwise returns 0.

The generation probability $P_c (y_s|y_{<s}, X, Q)$ described above is an application of a concept of CopyNet. CopyNet refers to a neural network model which, by allowing a generation probability of a word to be given even from outside of an output of the LSTM, makes it easier for an encode-side word to be generated (copied) as-is. In the first embodiment of the present invention, introducing the generation probability $P_C (y_s| y_{<s}, X, Q)$ makes it easier for a word included in the relevant document X to be generated (copied) as the s-th word $y_s$. Therefore, introducing the generation probability $P_C (y_s| y_{<s}, X, Q)$ enables the input question Q that is considered a defective question to be supplemented by a word included in the relevant document X. For details of CopyNet, for example, refer to Reference 5 and Reference 6 below.

[Reference 5] Z. Cao, C. Luo, W. Li, and S. Li. Joint copying and restricted generation for paraphrase. Proceedings of the Thirty-First AAAI Conference on Artificial Intelligence (AAAI2017), pp. 3152-3158, 2017.

[Reference 6] J. Gu, Z. Lu, H. Li, and V. O. Li. Incorporating copying mechanism in sequence-to-sequence learning. Proceedings of the 54th Annual Meeting of the Association for Computational Linguistics (ACL2016), pp. 1631-1640, 2016.

Step 103-6: Next, using a weight $\lambda_s$, the question restoring unit 220 calculates a final generation probability $P (y_s|y_{<s}, X, Q)$ of the word $y_s$ according to Expression (18) below.

[Formula 17]

$$P(y_s|y_{<s},X,Q)=\lambda_s P_c(y_s|y_{<s},X,Q)+(1-\lambda_s)P_G(y_s|y_{<s},X,Q) \quad (18)$$

where the weight $\lambda_s$ is calculated by Expression (19) below.

[Formula 18]

$$\lambda_s = \sigma(W_\lambda \hat{c}_s + b_\lambda) \quad (19)$$

where $W_\lambda \in R^{1 \times 2d}$ and $b_\lambda \in R^1$ are parameters and σ denotes a sigmoid function.

The generation probability $P (y_s|y_{<s}, X, Q)$ described above is a weighted average of $P_G (y_s|y_{<s}, X, Q)$ and $P_C$ ($y_s|y_{<s}$, X, Q) by the weight $\lambda_s$. Therefore, whether or not a word included in the relevant document X is copied as $y_s$ is determined by the weight $\lambda_s$.

Step 103-7: Next, the question restoring unit 220 generates the word $y_s$ according to the final generation probability P ($y_s|y_{<s}$, X, Q) calculated using Expression (18) above. In other words, for example, the question restoring unit 220 generates, as $y_s$, a word which maximizes P ($y_s| y_{<s}$, X, Q) among respective words included in the relevant document X and the input question Q.

By repeating steps S103-1 to S103-7 until <EOS> is generated as the word $y_s$, a revised question RQ constituted by the respective words $y_s$ (s=0, 1, . . . ) is generated. The revised question RQ is output to a prescribed output destination by the revised question generating unit 200. In this case, examples of the prescribed output destination include the display device 502, the auxiliary storage device 508, other programs (for example, a program that executes a question answering task), and the like.

In this case, the revised question RQ is created based on the input question Q by adding information inside the relevant information X to the input question Q. At this point, when the revised question RQ is generated by a generation model such as an Encoder-Decoder model using only matching information, the generated revised question RQ may end up being unrelated to the relevant document X and the input question Q. In consideration thereof, in the first embodiment of the present invention, according to a method to which the concept of CopyNet is applied, using not only matching information but also information of the relevant document X itself enables the revised question RQ that is related to the relevant document X to be generated with respect to the input question Q that is considered a defective question.

While one word $y_s$ is generated with respect to each s in step S103-7 described above, this processing is not limited thereto and, alternatively, a plurality of words $y_s$ may be generated with respect to a given s (or all s's). Generating a plurality of words $y_s$ enables, for example, a plurality of revised questions RQ to be generated using a beam search or the like. A beam search refers to a type of search algorithm similar to a breadth-first search of a graph. When using a beam search, for example, the question restoring unit 220 generates words $y_s$ corresponding to a breadth of B-number of beams with respect to each s. Accordingly, when a word length of the finally-generated revised question RQ is denoted by L, $B^L$-number of candidates of the revised question RQ are generated. Next, by arranging the candidates according to generation scores using a beam search and outputting q-number of candidates with the highest scores, the question restoring unit 220 can generate a plurality of variations of the revised question RQ.

In addition, while a case where the word $y_0$ is assumed to be <BOS> and the revised question RQ is generated in sequence from a word at the beginning of a sentence has been described in steps S103-1 to S103-7 above, processing is not limited thereto and, for example, the word $y_0$ may be assumed to be <EOS> and the revised question RQ may be generated in sequence from a word at the end of the sentence.

(Partial Generation and Whole Generation)

In the generation processing of a revised question according to the first embodiment of the present invention, a revised question RQ which supplements a part of defects of the input question Q that is considered a defective question may be generated or a revised question RQ that supplements all of the defects of the input question Q may be generated. Hereinafter, generating the revised question RQ which supplements a part of the defects of the input question Q will be referred to as "partial generation" and generating the revised question RQ which supplements all of the defects of the input question Q will be referred to as "whole generation".

Specifically, for example, let us assume that a question of which question contents are clear and which includes information necessary to form an answer without lack (hereinafter, such a question will be referred to as a "whole question") is "What is the fee for midterm cancellation of Plan A?" and that the input question Q is "What is the fee?".

In this case, in partial generation, for example, "What is the fee for midterm cancellation?" is generated as the revised question RQ. On the other hand, in whole generation, for example, a whole question that reads "What is the fee for midterm cancellation of Plan A?" is generated as the revised question RQ.

Therefore, in this case, in order to obtain a whole question by partial generation, generation processing of a revised question must be performed once again using, as the input question Q, "What is the fee for midterm cancellation?" that has been obtained as a revised question RQ. Accordingly, the whole question that reads "What is the fee for midterm cancellation of Plan A?" is obtained as the final revised question RQ.

As described above, while generation processing of a revised question must be repetitively executed in order to obtain a whole question when using partial generation, generally, partial generation enables a whole question to be restored with higher accuracy than whole generation.

It should be noted that whether the generation processing of a revised question is partial generation or whole generation is determined by a learning data set to be used in learning processing of a revised question generation model. In addition, whether to perform partial generation or whole generation as the generation processing of a revised question is determined in accordance with a question answering task in which the revised question is to be used.

In this case, a learning data set refers to a set of learning data that is expressed as a pair of the input question Q to be used as correct-answer data and the relevant document X. In addition, it is assumed that a label is added to each word constituting the input question Q to be used as correct-answer data, the label taking a value of 1 when the word is a word included in the relevant document X but otherwise taking a value of 0. Hereinafter, for convenience sake, the input question Q to be used as correct-answer data is referred to as a "correct-answer question $Q_{true}$".

(Learning Processing of Revised Question Generation Model)

Figure 6:
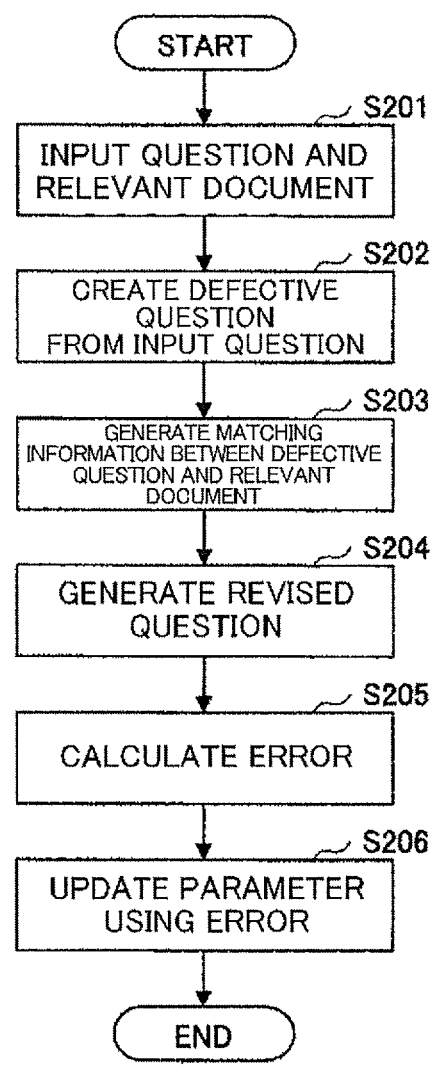
FIG. 6 is a flow chart showing an example of learning processing of the revised question generation model according to the first embodiment of the present invention.

Next, learning processing of a revised question generation model according to the first embodiment of the present invention will be described with reference to FIG. 6. FIG. 6 is a flow chart showing an example of learning processing of the revised question generation model according to the first embodiment of the present invention. For example, the learning processing of the revised question generation model involves dividing a learning data set into a prescribed number of mini-batches and subsequently updating a parameter of the revised question generation model for each mini-batch.

Steps S201 to S204 below are repetitively executed using each piece of learning data included in a mini-batch. On the other hand, steps S205 and S206 below are executed after steps S201 to S204 have been executed with respect to all of the pieces of learning data included in the mini-batch.

Step S201: The defective question creating unit 300 inputs a correct-answer question $Q_{true}$ included in learning data. In addition, the revised question generation model learning unit 400 inputs the correct-answer question $Q_{true}$ included in the learning data and the relevant document X.

Step S202: Next, the defective question creating unit 300 creates a question Q (a defective question Q) by omitting a part of the correct-answer question $Q_{true}$. At this point, generally, while there are a plurality of variations of the defective question Q with respect to the correct-answer question $Q_{true}$ the defective question creating unit 300 may create all of these defective questions Q or may create a part of (including one of) the defective questions Q.

For example, let us assume that the correct-answer question $Q_{true}$ is "Tell me about the fee for Plan A". In this case, "Tell me about the fee" and "Tell me" exist as variations of the defective question Q. Therefore, the defective question creating unit 300 may create both of the defective questions Q of "Tell me about the fee" and "Tell me" or may be create the defective question Q reading either "Tell me about the fee" or "Tell me.

When learning the revised question generation model that realizes partial generation, after adopting a whole query that is the same as the correct-answer question $Q_{true}$ as the defective question Q, a token <BOS> indicating a beginning of a sentence may be set as the correct-answer question $Q_{true}$. Accordingly, for example, when performing generation processing of a revised question by partial generation, it is recognized that a whole question has been generated as the revised question RQ when <BOS> is generated as a word yr.

For example, let us assume that the whole question is "What is the fee for midterm cancellation of Plan A?". In this case, in a first partial generation, the revised question RQ that reads "What is the fee for midterm cancellation?" is generated from the input question Q that reads "What is the fee?". Next, in a second partial generation, the revised question RQ that reads "What is the fee for midterm cancellation of Plan A?" is generated from the input question Q that reads "What is the fee for midterm cancellation?". Next, in a third partial generation, the revised question RQ "<BOS>" is generated from the input question Q that reads "What is the fee for midterm cancellation of Plan A?". The generation of <BOS> indicates that there are no more clauses that can be added (generated). Therefore, it is recognized that the second revised question RQ that reads "What is the fee for midterm cancellation of Plan A?" constitutes the whole question.

While an arbitrary method can be used as a creation method of the defective question Q, for example, the defective question Q can be created using a result of performing parsing such as dependency analysis or a phrase structure analysis of the correct-answer question $Q_{true}$. In addition, a granularity of a portion to be omitted from the correct-answer question $Q_{true}$ can also be arbitrary set.

As an example of the creation method of the defective question Q, there is a method of omitting clauses in sequence from the beginning of a sentence. For example, let us assume that the correct-answer question $Q_{true}$ is "What is the fee for midterm is cancellation of Plan A?". The correct-answer question $Q_{true}$ is constituted by three clauses, namely, "Plan A", "for midterm cancellation of", and "what is the fee?". Therefore, in this case, for example, the defective question creating unit 300 creates, as the defective question Q, "What is the fee for midterm cancellation?" which represents an omission of one clause at the beginning of the sentence and "What is the fee?" which represents an omission of two clauses at the beginning of the sentence.

As another example of the creation method of the defective question Q, there is a method which involves extracting two arbitrary clauses in a dependency relation from the correct-answer question $Q_{true}$ and adopting a sentence in which the two extracted clauses are combined in accordance with the dependency relation as the defective question Q. In this case, when a clause that forms a dependency relation with the obtained defective question Q exists in the correct-answer question $Q_{true}$, a sentence obtained by further combining the defective question Q with the clause may be adopted as a new defective question Q.

In addition, when the correct-answer question $Q_{true}$ is described in a language such as English, the defective question Q may be created by performing a phrase structure analysis, a dependency tree analysis, or the like and making a defect in units of clauses or words from the analysis result. For example, when the correct-answer question $Q_{true}$ is described in English, a is defective question Q that represents an omission of a phase structure including and subsequent to a noun phrase (NP) from the correct-answer question $Q_{true}$ may be created.

It should be noted that the defective question creating unit 300 preferably does not create a defective question Q in which syntactic information of the correct-answer question $Q_{true}$ has been destroyed. For example, when the correct-answer question $Q_{true}$ is "Tell me about the fee for Plan A" and an analysis result of dependency analysis is to be used, a defective question Q reading "Tell me about Plan A" which is not in a dependency relation is preferably not created.

In addition, for example, the defective question creating unit 300 may create the defective question Q by pattern matching. For example, using a prescribed expression as a marker, a defective position in the correct-answer question $Q_{true}$ is determined. Specifically, for example, as the prescribed expression, "when . . . " may conceivably be used as a marker. In this case, when the correct-answer question $Q_{true}$ is "What is the penalty when the contract is for less than 2 years?", a defective question Q that reads "What is the penalty?" can be created which represents an omission of a portion of the sentence subsequent to the marker "when . . . ".

Step S203: The collating unit 210 of the revised question generation model learning unit 400 generates matching information. Since step S203 is similar to step S102 in FIG. 4 with the exception of the input question Q in step S102 being replaced with the defective question Q, a description thereof will be omitted.

Step S204: The question restoring unit 220 of the revised question generation model learning unit 400 generates the revised question RQ. Since step S204 is similar to step S103 in FIG. 4 with the exception of the input question Q in step S103 being replaced with the defective question Q, a description thereof will be omitted.

Step S205: The parameter updating unit 410 of the revised question generation model learning unit 400 calculates an error between the revised questions RQ respectively generated using each piece of learning data included in the mini-batch and the correct-answer question $Q_{true}$ that is included in the learning data. As an error function to be used in the calculation of the error, for example, cross entropy may be used. The error function is to be appropriately determined in accordance with the revised question generation model.

Step S206: Using the error calculated in step S205 described above, the parameter updating unit 410 of the revised question generation model learning unit 400 updates the parameter of the revised question generation model. Specifically, for example, using the error calculated in step S205 described above, the parameter updating unit 410 updates the parameter of the revised question generation model by calculating a partial differential value of the error function according to back propagation. Accordingly, the revised question generation model is learned.

The error function to be used when updating a parameter of the revised question generation model shown in FIG. 5 will now be described.

In the revised question generation model shown in FIG. 5, the parameter (hereinafter, a parameter that is a learning object will be denoted by "θ") must be learned so that each word $y_s$ generated with a generation probability P matches the correct-answer question $Q_{true}$. In this case, as the generation probability P of the word $y_s$, an appropriate $\lambda_s$ must be set as represented by Expression (18) above. In consideration thereof, in the first embodiment of the present invention, it is assumed that the revised question generation model is learned according to multitask learning in which the generation probability P of the word $y_s$ and $\lambda_s$ are learned at the same time and that the error function is a sum $L(\theta)=L_g+L_\lambda$, of an error $L_g$ related to the generation probability P of the word $y_s$ and an error $L_\lambda$ related to $\lambda_s$. The parameter θ is updated so as to minimize the error function L.

In this case, it is shown that the closer a value of $\lambda_s$ is to 1, the higher a probability that a word included in the relevant document X is copied as $y_s$. As described earlier, during learning, it is assumed that a label is added to each word constituting the input question Q to be used as correct-answer data, the label taking a value of 1 when the word is a word included in the relevant document X but otherwise taking a value of 0. By learning a neural network that generates $\lambda_s$ with the label as a correct answer, $\lambda_s$ becomes a probability for predicting whether or not the word $y_s$ generated by $\hat{c}s$ is a word included in the relevant document X. During generation of the revised question RQ, the learning causes a determination to be made such that the closer the value of $\lambda_s$ is to 1, the higher the probability that a word that is desirably generated is within the relevant document X, and causes a generation probability $P_c$ to be strongly considered.

The errors $L_\lambda$ and $L_g$ in the error function $L(\theta)=L_g+L_\lambda$ described above may be calculated by a general method employed when learning a neural network. For example, the error $L_\lambda$ can be calculated using binary cross entropy and the error $L_g$ can be calculated using negative log likelihood or the like.

(Modification of Revised Question Generation Model)

Figure 7:
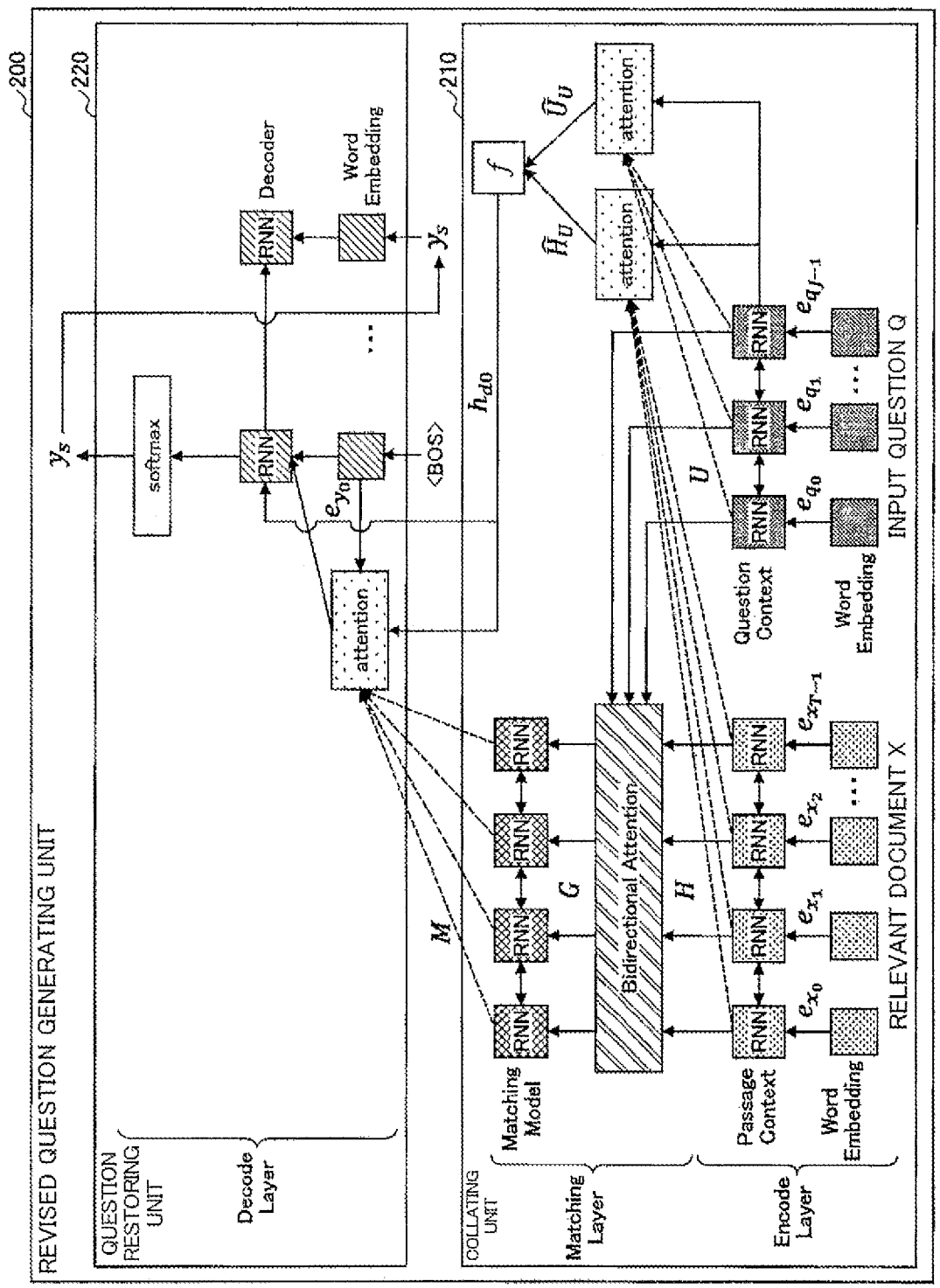
FIG. 7 is a diagram showing a modification (a first modification) in a case where the revised question generation model according to the first embodiment of the present invention is realized by a neural network.
Figure 8:
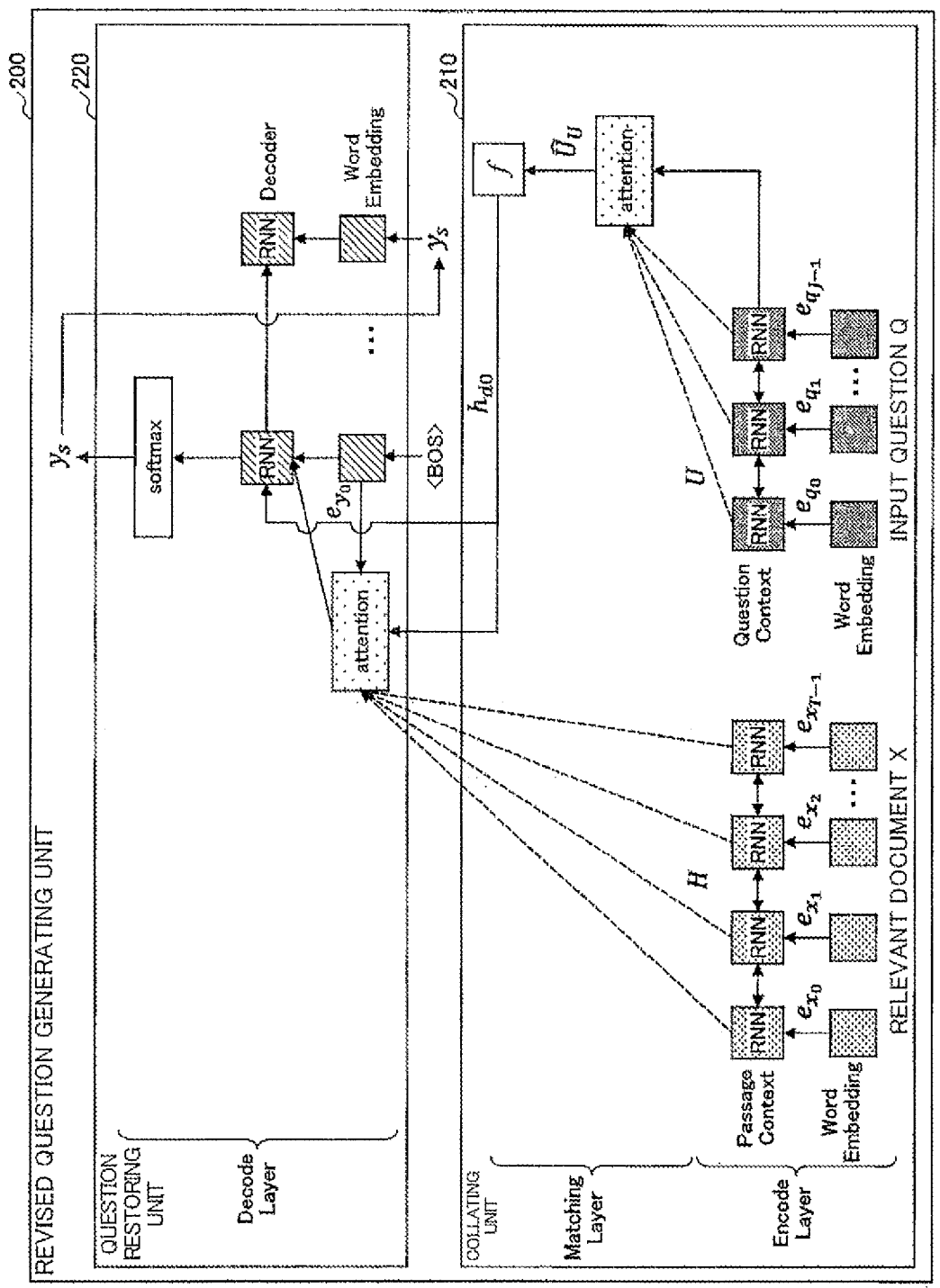
FIG. 8 is a diagram showing a modification (a second modification) in a case where the revised question generation model according to the first embodiment of the present invention is realized by a neural network.

While a case where the revised question generating unit 200 is realized by the revised question generation model shown in FIG. 5 has been described in the first embodiment of the present invention, for example, the revised question generating unit 200 may be realized by a revised question generation model shown in FIG. 7 or a revised question generation model shown in FIG. 8.

The revised question generation model shown in FIG. 7 is a model which does not have a mechanism for calculating the generation probability $P_C$ ($y_s|y_{<s}$, X, Q) in the Decode Layer. In this case, a final generation probability P of the word $y_s$ is expressed as P ($y_s|y_{<s}$, X, Q)=$P_G$ ($y_s|y_{<s}$, X, Q).

The revised question generation model shown in FIG. 8 is the revised question generation model shown in FIG. 7 but with the further omission of the Matching Layer. In this case, as processing of the Decode Layer, in the attention mechanism (attention), an input $\hat{z}s$ to the Decoder is calculated using a context matrix H instead of the matching matrix M.

(Modification of Functional Configuration of Question Generation Device 100)

There may be cases where, during generation of the revised question RQ, the relevant document X that is related to the input question Q is unclear and only a document set that is assumed to include the relevant document X can be obtained. In such a case, performing generation processing of a revised question using the respective documents included in the document set increases processing time. In consideration thereof, as preprocessing of the processing of a revised question, processing for retrieving the relevant document X from the document set can conceivably be performed.

Figure 9:
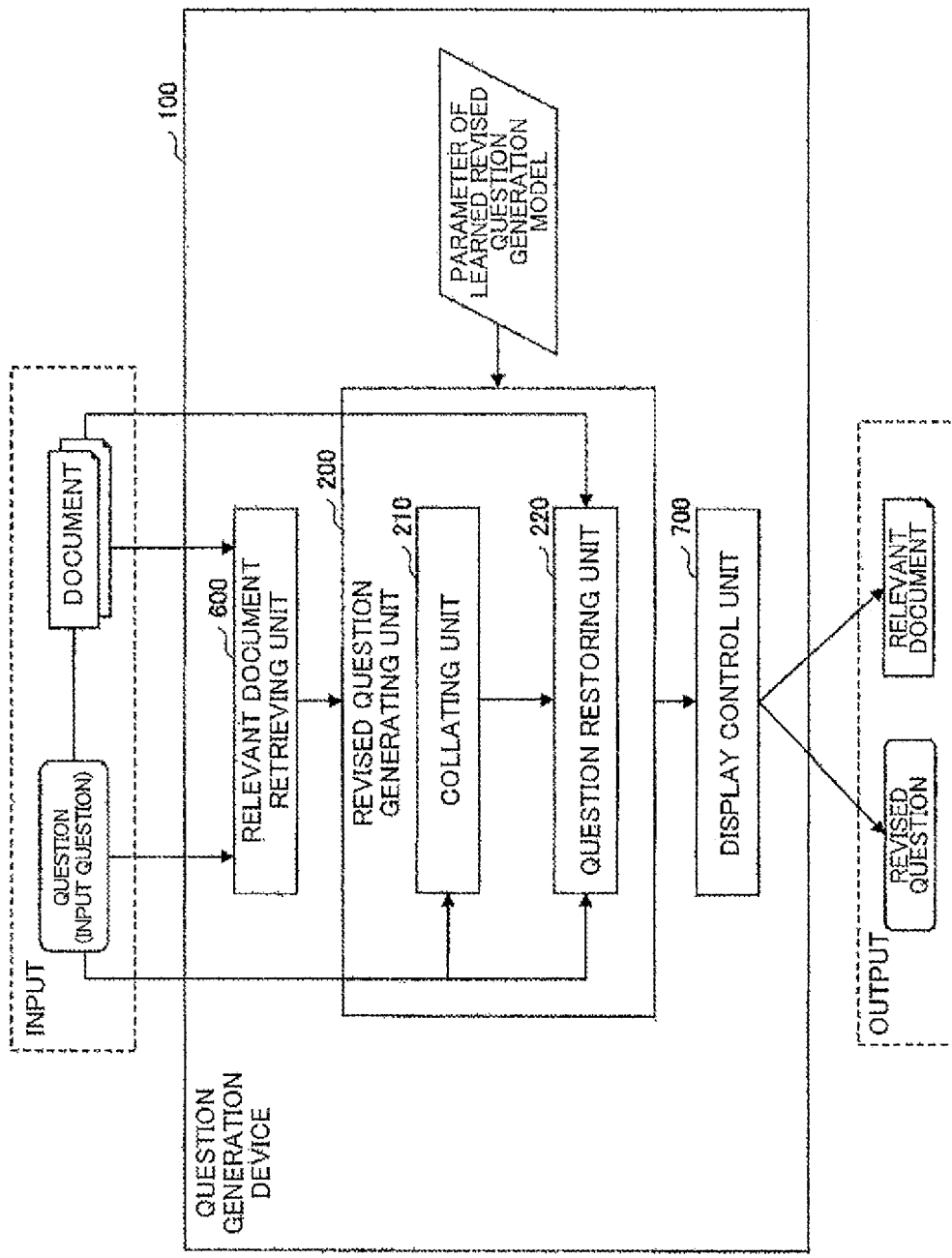
FIG. 9 is a diagram showing a modification of the functional configuration of the question generation device during revised question generation according to the first embodiment of the present invention.

A functional configuration of the question generation device 100 which performs the preprocessing described above is shown in FIG. 9. FIG. 9 is a diagram showing a modification of the functional configuration of the question generation device 100 during revised question generation according to the first embodiment of the present invention.

As shown in FIG. 9, the question generation device 100 during revised question generation may further have a relevant document retrieving unit 600. The relevant document retrieving unit 600 inputs the input question Q and a document set Y and retrieves a document (a relevant document) X that is related to the input question Q from the document set Y. In addition, the relevant document retrieving unit 600 outputs the retrieved relevant document X to the revised question generating unit 200. Accordingly, even in cases where only a document set that is assumed to include the relevant document X can be obtained, the revised question RQ can be readily obtained.

As the retrieval method by the relevant document retrieving unit 600, an arbitrary retrieval method can be used. For example, after respectively calculating a score between each document included in the document set Y and the input question Q, N'-number of documents with highest scores may be adopted as the relevant document X. While a value of N' may be arbitrarily set, for example, N' is conceivably set to around 1 to 10.

The relevant document X retrieved by the relevant document retrieving unit 600 and the revised question RQ generated from the relevant document X and the input question Q may also conceivably be presented to a questioner (a user) having posed the input question Q. In consideration thereof, as shown in FIG. 9, the question generation device 100 during revised question generation may further have a display control unit 700. The display control unit 700 displays the relevant document X retrieved by the relevant document retrieving unit 600 and the revised question RQ generated by the revised question generating unit 200 from the relevant document X and the input question Q.

(Application)

As described above, for example, when a value of 2 or more is set as N', a plurality of relevant documents X may be obtained from the document set Y. In this case, the revised question RQ can be generated using each of the plurality of relevant documents X.

For example, when two relevant documents, namely, a relevant document $X_1$ and a relevant document $X_2$ are obtained from the document set Y, a revised question $RQ_1$ using the input question Q and the relevant document $X_1$ and a revised question $RQ_2$ using the input question Q and the relevant document $X_2$ are obtained by the revised question generating unit 200.

Therefore, as an application of the question generation device 100, a chatbot is conceivable which, when some kind of question (the input question Q) is posed by the user, presents the user with a plurality of revised questions RQ and the relevant documents X used to generate the revised questions RQ.

Figure 10:
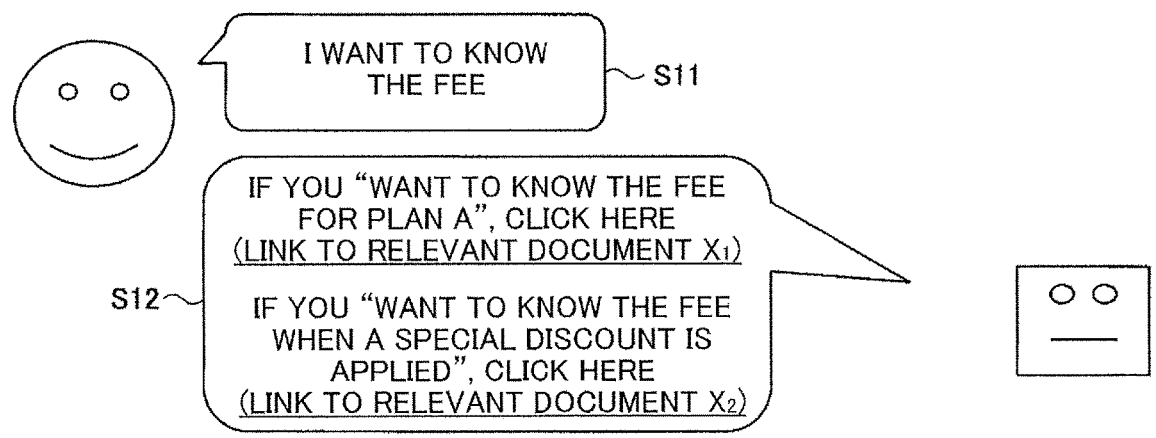
FIG. 10 is a diagram showing an application (a first application) to a chatbot.

For example, as shown in FIG. 10, when the input question Q that reads "I want to know the fee" is input by the user (S11), the relevant document retrieving unit 600 of the question generation device 100 retrieves a plurality of relevant documents X (the relevant document $X_1$ and the relevant document $X_2$) from the document set Y. In addition, the display control unit 700 of the question generation device 100 displays, to the user, a revised question $RQ_1$ that reads "I want to know the fee for Plan A" having been generated by the revised question generating unit 200 from the relevant document $X_1$ and the input question Q together with a link to the relevant document $X_1$ and a revised question $RQ_2$ that reads "I want to know the fee when a special discount is applied" having been generated by the revised question generating unit 200 from the relevant document $X_2$ and the input question Q together with a link to the relevant document $X_2$ (S12). Accordingly, even when the user poses an ambiguous question (the input question Q), the question generation device 100 is capable of presenting the user with a plurality of revised questions RQ together with links to the relevant documents X which are respectively related to the plurality of revised questions RQ.

Figure 11:
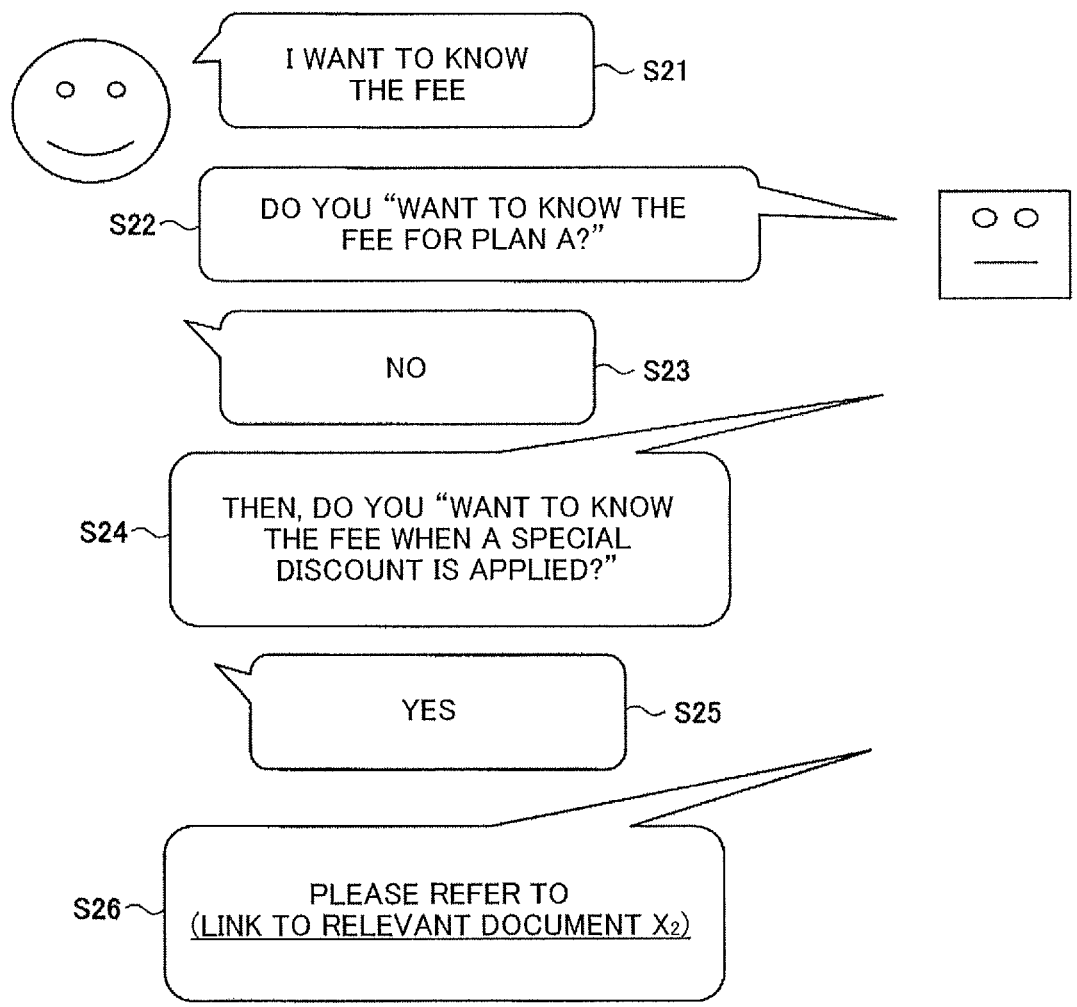
FIG. 11 is a diagram showing an application (a second application) to a chatbot.

In addition, as another application to a chatbot, the plurality of revised questions RQ and the relevant documents X may be presented in sequence. For example, as shown in FIG. 11, when the input question Q that reads "I want to know the fee" is input by the user (S21), the relevant document retrieving unit 600 of the question generation device 100 retrieves a plurality of relevant documents X (the relevant document $X_1$ and the relevant document $X_2$) from the document set Y. In addition, the display control unit 700 of the question generation device 100 displays, for example, a text for confirming with the user whether or not the revised question $RQ_1$ that reads "I want to know the fee for Plan A" describes the user's intention (S22).

When an answer indicating negation such as "No" is input by the user with respect to the confirmation text (S23), the display control unit 700 of the question generation device 100 displays, for example, a text for confirming with the user whether or not the revised question $RQ_2$ that reads "I want to know the fee when a special discount is applied" describes the user's intention (S24).

When an answer indicating affirmation such as "Yes" is input by the user with respect to the confirmation text (S25), the display control unit 700 of the question generation device 100 presents the user with, for example, a link to the relevant document $X_2$ (S26).

Accordingly, even when the user poses an ambiguous question (the input question Q), the question generation device 100 is capable of presenting the user with the revised question RQ and a link to the relevant document X that is related to the revised question RQ in an interactive manner.

(Summary)

As described above, using a revised question generation model that is realized by, for example, a neural network, the question generation device 100 according to the first embodiment of the present invention is capable of generating a revised question RQ that is free of defects from an input question Q that may include a potential defect. Accordingly, for example, when performing a question answering task or the like using the revised question RQ, answer accuracy of the question answering task can be improved.

In addition, with the question generation device 100 according to the first embodiment of the present invention, when generating the revised question RQ using a revised question generation model, the revised question RQ to which a word included in a relevant document X that is related to the input question Q is copied is generated. Accordingly, answer accuracy of the question answering task described above can be further improved and, at the same time, a user can recognize from which part of the relevant document X the revised question RQ has been generated.

Furthermore, the question generation device 100 according to the first embodiment of the present invention is capable of generating a plurality of variations of the revised question RQ with respect to a single input question Q. For example, the question generation device 100 according to the first embodiment of the present invention is capable of generating, with respect to a single input question Q that reads "I want to know the fee", a variation including "I want to know the fee for Plan A" and "I want to know the fee when a special discount is applied" as the revised question Q. Accordingly, for example, the user can even be asked to select the revised question Q that is close to an intention of a question among a plurality of variations of the revised question Q.

In addition, by generating a plurality of variations of the revised question RQ with respect to a single input question Q, the question generation device 100 according to the first embodiment of the present invention can be applied to, for example, automatic creation, expansion, or the like of "frequently asked questions (FAQ)".

Second Embodiment

Next, a second embodiment of the present invention will be described.

(Outline)

In the first embodiment presented above, a case has been described in which, when an input question and a relevant document are given, the question generation device 100 uses a revised question generation model to generate a revised question of the input question. However, for example, when the input question is short, ambiguous, or the like, an answer to the input question may not always be uniquely specifiable and possible answers may exist at a plurality of locations in the relevant document. Therefore, in such cases, when a question is elaborated or substantiated without taking an answer into consideration, a revised question that is unanswerable may end up being generated. In addition, even when elaboration or substantiation is performed on a plurality of patterns, there is also a possibility that answers to all revised questions end up being the same. Furthermore, question answering techniques such as machine comprehension are often limited to giving one answer (in other words, one-question, one-answer) and are unable to completely accommodate questions to which a plurality of answers are assumed.

In consideration thereof, in the second embodiment of the present invention, when an input question and a relevant document are given, the question generation device 100 performs question answering and generates N-number (where N is an integer equal to or larger than 1) of answers with respect to the input question before generating a revised question. In addition, the question generation device 100 generates a revised question with respect to each of the N-number of answers. Accordingly, even when there are a plurality of answers with respect to the input question, a revised question for uniquely obtaining each of such answers by machine comprehension or the like can be generated and high answer accuracy can be realized even with respect to short questions and ambiguous questions. Since the N-number of answers that are generated by question answering become candidates of a final answer (in other words, an answer that is truly required by a questioner) with respect to the input question, the N-number of answers will also be referred to as "answer candidates".

Generation of a revised question according to the second embodiment of the present invention will be described in more detail with reference to FIG. 12. For example, let us assume that a relevant document and an input question that reads "What was the yen exchange rate as of 5 p.m.?" shown in FIG. 12 are given. In this case, in the relevant document, there exists a plurality of answer candidates with respect to the input question (in other words, as answer candidates with respect to the input question, information on the exchange rate of the yen against the dollar and information on the exchange rate of the yen against the euro are described in the relevant document). Therefore, at this time point, a determination cannot be made as to which answer candidate among the plurality of answer candidates is the answer that is truly required by the questioner.

In consideration thereof, in the second embodiment of the present invention, two answer candidates are first generated, namely, answer 1 that reads "109.74 to 109.75 to the dollar, a rise of 0.26 yen against the dollar as compared to last weekend" and answer 2 that reads "129.57 to 129.61 to the euro, a fall of 0.64 yen against the euro as compared to last weekend". In addition, by using these answers to elaborate or substantiate an input question so as to form a question that enables the answers to be uniquely determined, a revised question is generated with respect to each answer. In the example shown in FIG. 12, "against the dollar" and "against the euro" are respectively added to the input question to generate a revised question 1 that reads "What was the yen exchange rate against the dollar as of 5 p.m.?" and a revised question 2 that reads "What was the yen exchange rate against the euro as of 5 p.m.?".

In this manner, in the second embodiment of the present invention, a revised question is generated according to (1) and (2) below.
(1) Question answering is performed with respect to an input question to generate N-number of answers (answer candidates) to the input question.
(2) For each of the N-number of answers, a revised question for obtaining the answer is generated (in other words, N-number of revised questions that respectively correspond to the N-number of answers are generated).

In this case, (1) and (2) above can be simultaneously executed on an end-to-end basis using a revised question generation model that is realized by a neural network. However, the revised question generation model does not necessarily need be realized by a neural network and all of or a part of the revised question generation model may be realized by a machine learning model other than a neural network. In addition, a model to perform the question answering in (1) described above and a model to generate the revised questions in (2) described above may be separately prepared to be used independently or in a combined manner.

In the question answering in (1) described above, information with a high possibility of becoming an answer (answer candidate) is discovered from a relevant document and an answer is given based on the discovered information. In this case, there are various methods of obtaining an answer (answer candidate) including a method involving adopting a description extracted as-is from the relevant document as an answer, a method involving generating a sentence to be used as the answer based on a description in the relevant document, and the like. In the second embodiment of the present invention, as an example, a method of adopting a description extracted as-is from the relevant document as an answer will be mainly described as the method of obtaining an answer (answer candidate) in (1) above.

In this case, in a similar manner to the first embodiment, in learning of a revised question generation model, an input question to be used as correct-answer data, a question (in other words, a defective question) formed by omitting a part of the input question, and a relevant document are used as input to update a parameter of the revised question generation model so that a natural sentence obtained using the defective question and the relevant document approaches the input question that is correct-answer data. At this point, in a similar manner to the first embodiment, matching between the defective question and the relevant document is performed and a defective portion is discovered from the relevant document and supplemented inside the revised question generation model. Due to such learning of the revised question generation model, in a similar manner to the first embodiment, for example, when an input question that is a short natural sentence and a relevant document are input, a potentially defective portion of the input question is discovered and supplemented from the relevant document and a revised query that is more elaborated or substantiated than the input question is generated.

In addition, in the second embodiment, during learning of the revised question generation model, a correct answer to the input question is considered correct-answer data and the parameter of the revised question generation model is updated so that the answer to the input question approaches the correct-answer data.

(Functional Configuration of Question Generation Device 100)

Figure 13:
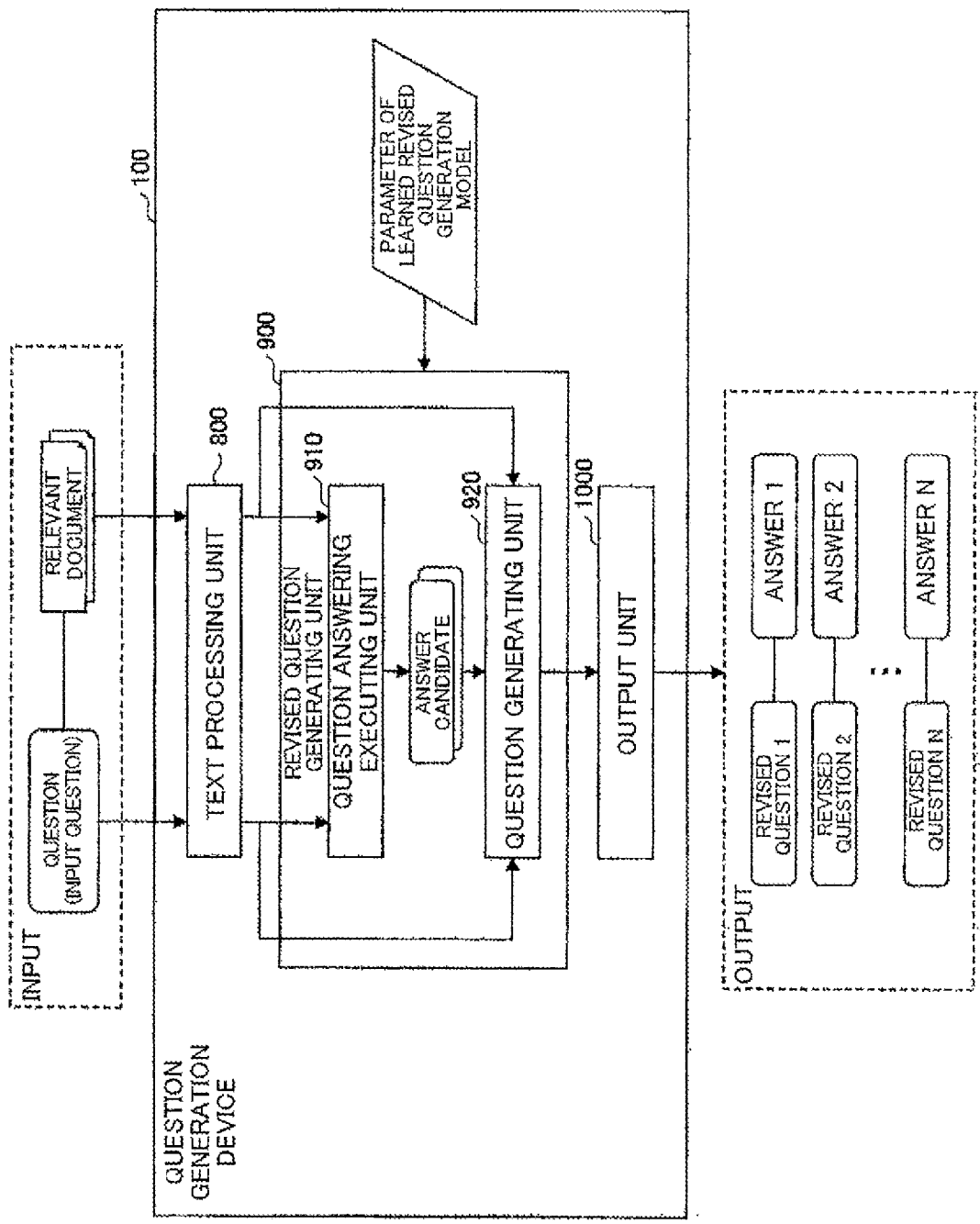
FIG. 13 is a diagram showing an example of a functional configuration of a question generation device during revised question generation according to the second embodiment of the present invention.

First, a functional configuration of the question generation device during revised question generation according to the second embodiment of the present invention will be described with reference to FIG. 13. FIG. 13 is a diagram showing an example of a functional configuration of the question generation device 100 during revised question generation according to the second embodiment of the present invention.

As shown in FIG. 13, the question generation device 100 according to the second embodiment of the present invention has a text processing unit 800, a revised question generating unit 900, and an output unit 1000.

The text processing unit 800 uses an input question described in a natural sentence and a relevant document as input and performs preprocessing for inputting the input question and the relevant document to the revised question generating unit 900. Specifically, for example, by performing morphological analysis or the like, the text processing unit 800 respectively converts the input question described in a natural sentence and the relevant document into sets of word tokens (word sequences). Alternatively, at least one of the input question and the relevant document may be a sentence obtained as a speech recognition result or the like. In addition, the relevant document to be input to the text processing unit 800 may be one or more documents (in other words, a set of relevant documents). In the second embodiment of the present invention, it is assumed that the expression "relevant document" includes sets of relevant documents.

In addition, hereinafter, in a similar manner to the first embodiment, it is assumed that an input question is to be converted into a set (a word sequence) of J-number of word tokens expressed as $Q=\{q_0, q_1, \ldots, q_J\}$, and the word sequence Q is to be also expressed as an input question Q. In a similar manner, it is assumed that a relevant document is to be converted into a set (a word sequence) of T-number of word tokens expressed as $X=\{x_0, x_1, \ldots, x_T\}$, and the word sequence X is to be also expressed as a relevant document X.

When the input question Q and the relevant document X that are represented by word sequences are input to the question generation device 100, the question generation device 100 need not have the text processing unit 800.

The revised question generating unit 900 performs question answering with respect to the input question and generation of a revised question that corresponds to an answer (an answer candidate) obtained by the question answering. The revised question generating unit 900 is realized by a learned revised question generation model (in other words, a revised question generation model using a parameter that has been updated by a revised question generation model learning unit 1100 to be described later).

In this case, the revised question generating unit 900 includes a question answering executing unit 910 and a question generating unit 920.

The question answering executing unit 910 inputs the input question Q and the relevant document X, performs question answering, and generates an answer candidate with respect to the input question Q from the relevant document X. As described above, the answer candidate generated at this point need not be limited to one answer candidate and N-number of answer candidates may be generated, where N is an integer equal to or larger than 1. While a method of adopting a description extracted as-is from the relevant document as an answer candidate will be used in the second embodiment of the present invention, the method is not restrictive and any method may be used as long as the method enables an answer that is a natural sentence to be obtained when using a question that is a natural sentence and an arbitrary document (a relevant document) as input.

Using the input question Q, the relevant document X, and the N-number of answer candidates as input, the question generating unit 920 generates a revised question RQ that is more elaborated or substantiated than the input question Q. At this point, the question generating unit 920 generates the revised question RQ with respect to each of the N-number of answer candidates (in other words, the question generating unit 920 generates N-number of revised questions that respectively correspond to the N-number of answer candidates).

In the second embodiment of the present invention, the question generating unit 920 generates the revised question RQ by adding, to the input question Q, information that enables each answer candidate to be uniquely specified. For example, information related to a condition such as "when . . ." and "in the case of . . ." may be described around information to be an answer candidate in the relevant document X. Therefore, by adding information related to such a condition to the input question Q, a revised question RQ that enables an answer (an answer candidate) when the condition is satisfied to be uniquely determined can be generated. Alternatively, for example, since named entities such as personal names and place-names may also be information beneficial for narrowing down an answer candidate, a revised question RQ in which such information is added to the input question Q may be generated.

As a method of generating the revised question RQ, a method of discovering information to be added to the input question Q, a method of adding information to the input question Q, and the like, any method can be adopted as long as the method enables "the revised question RQ to be generated by adding information that enables each answer candidate to be respectively uniquely specified to the input question Q". For example, a method may be used in which, after discovering information regarding "when . . ." described above by pattern matching and extracting the information, information that is located nearest to an answer (an answer candidate) in the extracted information is added to a beginning of the input question Q to generate the revised question RQ. Alternatively, for example, the revised question RQ may be generated using a neural network-based sentence generation method.

The output unit 1000 outputs N-number of answers (answer candidates) and N-number of revised questions RQ that respectively correspond to each of the N-number of answers. In this case, for example, the output unit 1000 outputs one or more pairs formed by a given answer candidate and the revised question RQ that corresponds to the answer candidate. As a method of outputting a pair of an answer candidate and the revised question RQ, an arbitrary method can be adopted in accordance with a user interface of the question generation device 100.

For example, when the question generation device 100 is equipped with a user interface that outputs answers on a screen in a similar manner to a retrieval system and the like, a method may be adopted which involves displaying candidates of the revised question RQ using the expression "by any chance . . ." in a similar manner to a retrieval result suggest function and displaying, when the revised question RQ is selected by the user, an answer (an answer candidate) that corresponds to the selected revised question RQ.

In addition, for example, when the question generation device 100 is equipped with a user interface based on spoken dialogue, a method may be adopted which involves uttering, when the input question Q is input by the user, with respect to the revised question RQ that corresponds to a highest likely answer (an answer candidate), a counter-question for confirmation such as "Do you mean **, by any chance?" ( denotes question contents of the revised question RQ), and uttering the answer (the answer candidate) corresponding to the revised question RQ when the user consents. In this case, for example, a method may be adopted which involves uttering, when the user does not consent to the utterance of the counter-question for confirmation, a counter-question for confirmation with respect to the revised question RQ corresponding to an answer (an answer candidate) with a next highest likelihood, and repeating these steps until the user consents. With respect to a likelihood of an answer (an answer candidate), for example, the question generation device 100 may be equipped with a function for calculating the likelihood, or a likelihood of an answer candidate may be calculated together with the generation of the answer candidate by the question answering executing unit 910**.

An output destination of the output unit 1000 is not limited to those described above and, for example, the output destination may be the auxiliary storage device 508, the recording medium 503a, or other devices or the like that are connected via a network.

Figure 14:
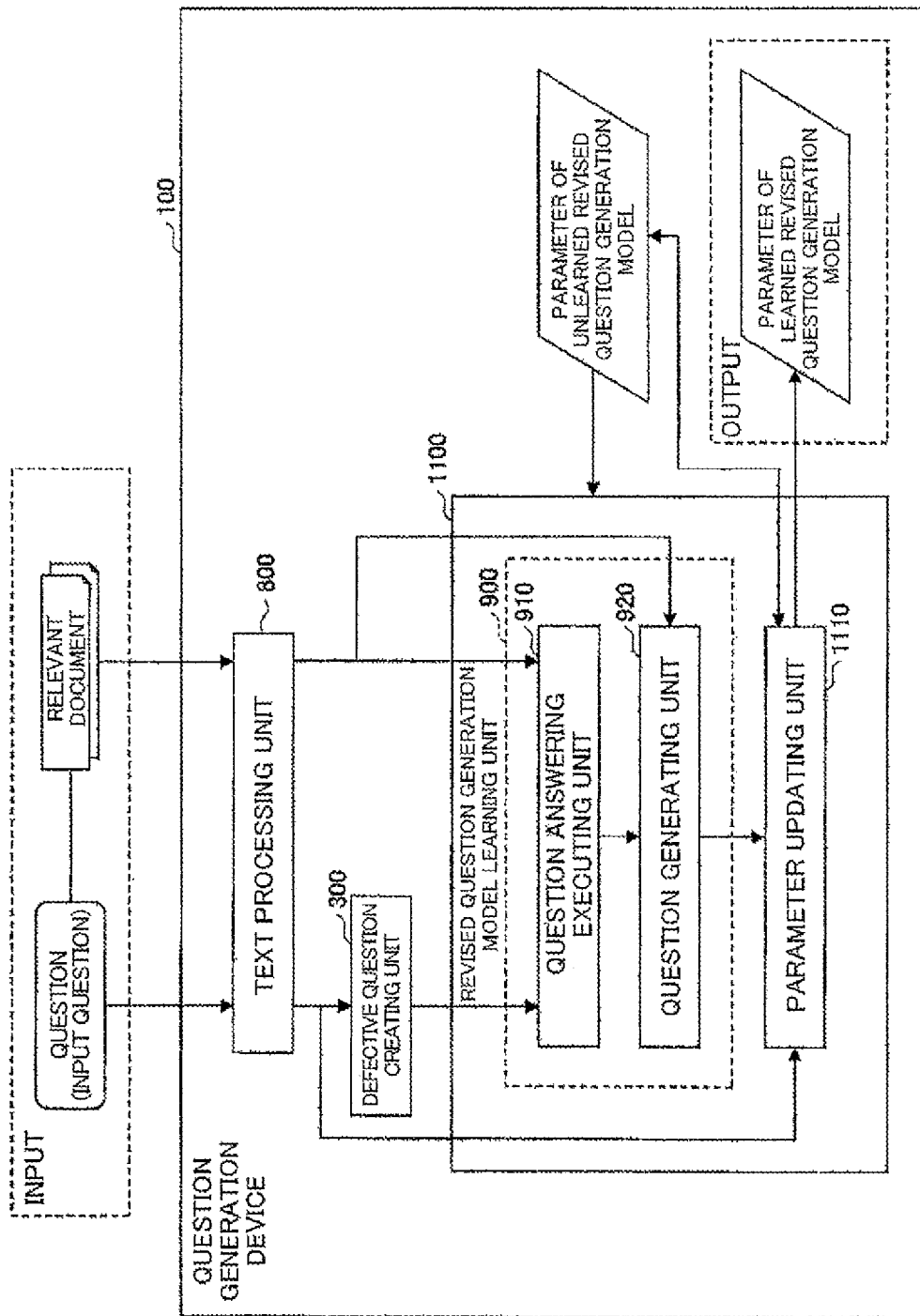
FIG. 14 is a diagram showing an example of a functional configuration of the question generation device during learning according to the second embodiment of the present invention.

Next, a functional configuration of the question generation device 100 during learning according to the second embodiment of the present invention will be described with reference to FIG. 14. FIG. 14 is a diagram showing an example of the functional configuration of the question generation device 100 during learning according to the second embodiment of the present invention.

As shown in FIG. 14, the question generation device 100 during learning according to the second embodiment of the present invention has the defective question creating unit 300 and the revised question generation model learning unit 1100.

The defective question creating unit 300 creates a defective question by inputting an input question Q and omitting a part of the input question Q in a similar manner to the first embodiment.

The revised question generation model learning unit 1100 learns a revised question generation model using the defective question created by the defective question creating unit 300, the input question Q, a correct answer $A_{true}$ to the input question Q, and a relevant document X. In addition, the revised question generation model learning unit 1100 outputs a parameter of the learned revised question generation model.

In this case, the revised question generation model learning unit 1100 includes the question answering executing unit 910, the question generating unit 920, and a parameter updating unit 1110. The question answering executing unit 910 and the question generating unit 920 are as described above. The parameter updating unit 1110 calculates an error between a natural sentence (the revised question RQ) generated by the question generating unit 920 and the input question Q and, at the same time, calculates an error between an answer to the input question Q according to the question answering executing unit 910 and a correct answer to the input question Q. In addition, using the errors, the parameter updating unit 1110 updates a parameter of the revised question generation model (a parameter of an unlearned revised question generation model) according to an arbitrary optimization method. As the parameter is updated by the parameter updating unit 1110, the revised question generation model is learned.

(Hardware Configuration of Question Generation Device 100)

Since the question generation device 100 according to the second embodiment of the present invention may adopt a similar hardware configuration to the first embodiment, a description thereof will be omitted.

(Generation Processing of Revised Question)

Figure 15:
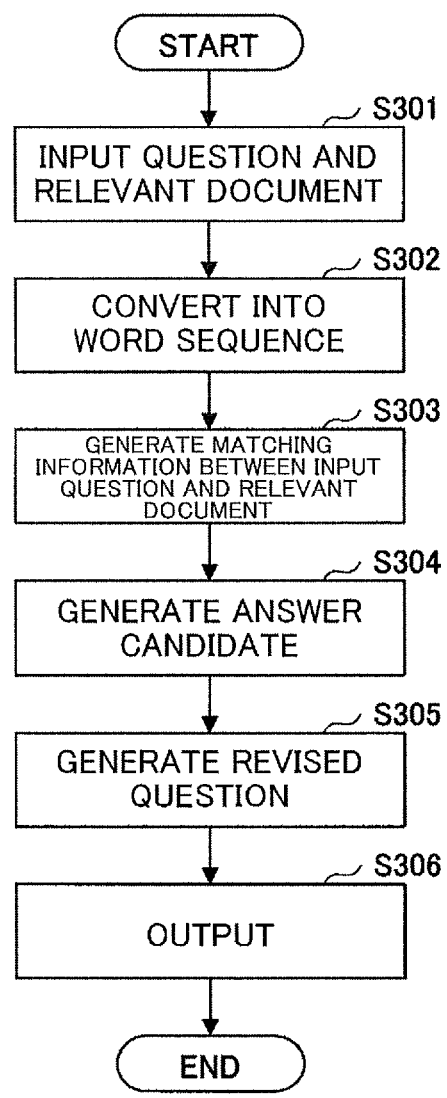
FIG. 15 is a flow chart showing an example of generation processing of a revised question according to the second embodiment of the present invention.

Next, generation processing of a revised question according to the second embodiment of the present invention will be described with reference to FIG. 15. FIG. 15 is a flow chart showing an example of the generation processing of a revised question according to the second embodiment of the present invention. In the generation processing of a revised question, it is assumed that a revised question generation model that realizes the revised question generating unit 900 is realized by a neural network and has already been learned.

Figure 16:
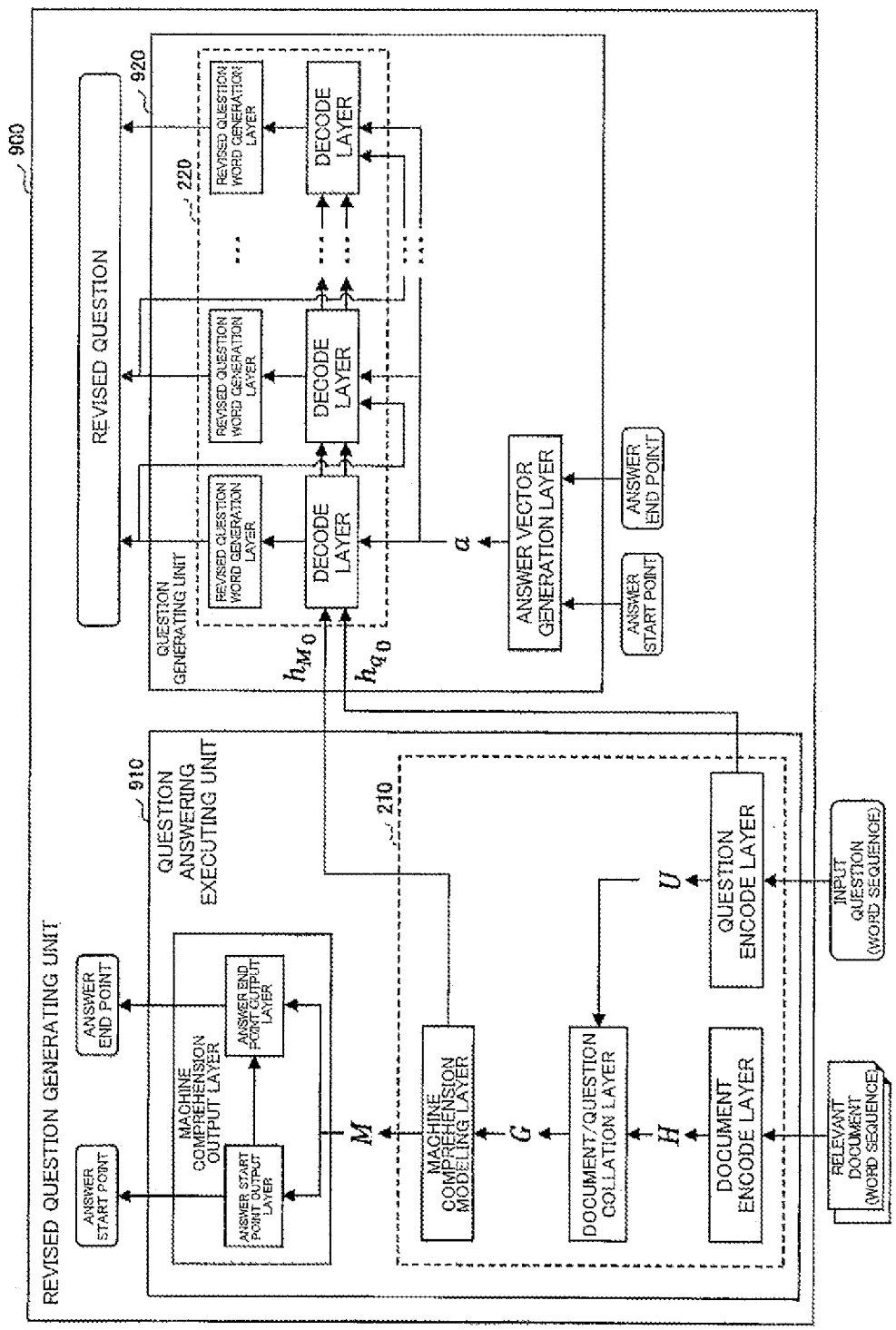
FIG. 16 is a diagram showing an example of a case where a revised question generation model according to the second embodiment of the present invention is realized by a neural network.

An example of the revised question generation model that realizes the revised question generating unit 900 according to the second embodiment of the present invention is shown in FIG. 16. As shown in FIG. 16, in the second embodiment of the present invention, the revised question generation model is a neural network constituted by a document encode layer, a question encode layer, a document/question collation layer, a machine comprehension modeling layer, a machine comprehension output layer, an answer vector generation layer, a decode layer, and a revised question word generation layer. Among these layers, the question answering executing unit 910 is realized by the document encode layer, the question encode layer, the document/question collation layer, the machine comprehension modeling layer, and the machine comprehension output layer. In addition, the question generating unit 920 is realized by the answer vector generation layer, the decode layer, and the revised question word generation layer.

It should be noted that the document encode layer, the question encode layer, the document/question collation layer, and the machine comprehension modeling layer correspond to the collating unit 210 according to the first embodiment. In addition, the decode layer and the revised question word generation layer correspond to the question restoring unit 220 according to the first embodiment.

The neural network that realizes the revised question generation model according to the second embodiment of the present invention is constructed based on an Encoder-Decoder model that is a method of generating a natural sentence with a neural network and a machine comprehension model that generates an answer of question answering with a neural network. In the machine comprehension model, generation of an answer candidate is realized by directly extracting a description to become the answer candidate from the relevant document X (in other words, estimating positions of a start point and an endpoint when extracting the description). The machine comprehension model is constituted by the document/question collation layer, the machine comprehension modeling layer, and the machine comprehension output layer. For details of the Encoder-Decoder model, for example, refer to Reference 1 above. In addition, for details of the machine comprehension model, for example, refer to NPL 1 above.

In the following generation processing of a revised question, detailed processing of each layer will also be described with reference to the revised question generation model shown in FIG. 16.

Step S301: The text processing unit 800 inputs an input question and a relevant document described in a natural sentence.

Step S302: The text processing unit 800 respectively converts the input question and the relevant document having been input into word sequences. As described above, hereinafter, assuming that the input question is converted into a word sequence Q of J-number of word tokens and the relevant document is converted into a word sequence X of T-number of word tokens, the expressions "input question Q" and "relevant document X" will be used.

When the input question Q and the relevant document X that are represented by word sequences are input to the question generation device 100, step S302 described above need not be performed.

Step S303: The revised question generating unit 900 generates, through steps S303-1 to S303-3 below, as matching information, state vectors $h_{q0}$ and $h_{M0}$ to be adopted as an initial state of the decode layer.

Step 303-1: First, the question answering executing unit 910 of the revised question generating unit 900 inputs the relevant document X and the input question Q and, as processing of the document encode layer and the question encode layer of the revised question generation model shown in FIG. 16, respectively converts (encodes) the relevant document X and the input question Q into d-dimensional word vector sequences. In other words, the question answering executing unit 910 creates word vector sequences by subjecting each word token that constitutes each of the relevant document X and the input question Q to d-dimensional real-vectorization.

In addition, the question answering executing unit 910 outputs the state vector $h_{q0}$ when encoding the input question Q into a d-dimensional word vector sequence.

In the second embodiment of the present invention, assuming that the word vector sequence of the relevant document X is represented by H, the expression "document vector sequence H" will be used. In addition, assuming that the word vector sequence of the input question Q is represented by U, the expression "question vector sequence U" will be used. In this case, the document vector sequence is expressed as $H \in R^{d \times T}$ and the question vector sequence is expressed as $U \in R^{d \times J}$.

At this point, as a method of respectively encoding the relevant document X and the input question Q into d-dimensional word vector sequences, any method can be adopted as long as the document vector sequence and the question vector sequence can be generated. For example, a method can be used which involves respectively inputting the relevant document X and the input question Q into a word embedding layer and converting each word token into a d-dimensional real vector, and subsequently converting the relevant document X and the input question Q into word vector sequences with an RNN. Alternatively, for example, encoding using an attention mechanism (attention) may be performed. However, since the state vector $h_{q0}$ output from the question encode layer is used as an initial state in the decode layer, the state vector $h_{q0}$ must be generated according to an arbitrary method.

While a case where the state vector $h_{q0}$ is generated only in the question encode layer will be described in the second embodiment of the present invention, a state vector $h_{x0}$ may be generated only in the document encode layer or also in the document encode layer. When the state vector $h_{x0}$ is generated only in the document encode layer, the state vector $h_{x0}$ may be used as an initial state in the decode layer. On the other hand, when the state vector $h_{q0}$ and the state vector $h_{x0}$ are respectively generated in the document encode layer and the question encode layer, one of or both of the state vectors can be used as an initial state in the decode layer.

Step S303-2: Next, as processing of the document/question collation layer of the revised question generation model shown in FIG. 16, the question answering executing unit 910 of the revised question generating unit 900 uses the document vector sequence H and the question vector sequence U to discover and extract information related to the input question Q in the relevant document X in order to perform machine comprehension. The discovery and the extraction is performed by collating the relevant document X and the input question Q with each other.

In this case, as a method of collating the relevant document X and the input question Q with each other, an arbitrary method can be adopted. For example, BiDAF using an attention mechanism (attention) can be adopted. In addition, for example, QANet using a CNN (Convolutional Neural Network) can also be adopted. For details of BiDAF using an attention mechanism (attention), for example, refer to NPL 1 above. In addition, for details of QANet using a CNN, for example, refer to Reference 7 below.

[Reference 7] Adams Wei Yu, David Dohan, Minh-Thang Luong, Rui Zhao, Kai Chen, Mohammad Norouzi, Quoc V. Le. QANet: Combining Local Convolution with Global Self-Attention for Reading Comprehension. ICLR2018

Accordingly, as a collation result between the relevant document X and the input question Q, a collating vector sequence $G \in R^{r \times T}$ that is an r-dimensional real vector sequence is output. In this case, r varies depending on the method used to collate the relevant document X and the input question Q with each other. The collating vector sequence G corresponds to the attention matrix G according to the first embodiment.

Step S303-3: As processing of the machine comprehension modeling layer of the revised question generation model shown in FIG. 16, the question answering executing unit 910 of the revised question generating unit 900 creates a machine comprehension modeling vector sequence $M \in R^{d \times T}$ using the collating vector sequence G. In this case, the machine comprehension modeling vector sequence M is created by, for example, performing a method using RNN with respect to the collating vector sequence G in a similar manner to the document encode layer and the question encode layer. In addition, at this point, the question answering executing unit 910 generates a hidden state vector $h_{M0}$ in a similar manner to the question encode layer. The hidden state vector $h_{M0}$ is used as an initial state of the decode layer. The machine comprehension modeling vector sequence M corresponds to the matching matrix M according to the first embodiment.

Step S304: Next, as processing of the machine comprehension output layer of the revised question generation model shown in FIG. 16, the question answering executing unit 910 of the revised question generating unit 900 generates an answer candidate using the machine comprehension modeling vector sequence M. The generation of the answer candidate is performed by extracting a start point and an end point of a description to become the answer candidate from the relevant document X.

In this case, with respect to the start point, as processing of an answer start point output layer that is included in the machine comprehension output layer of the revised question generation model shown in FIG. 16, after creating a start point vector $O_{start} \in R^T$ by linearly transforming the machine comprehension modeling vector sequence M with a weight $W_0 \in R^{1 \times d}$, a softmax function is applied to the start point vector $O_{start}$ at a sequence length of T to convert the start point vector $O_{start}$ into a probability distribution $P_{start}$. In addition, using the probability distribution $P_{start}$, a $t_{start}$-th element (where $0 \le t_{start} \le T$) with a highest probability is extracted from the relevant document X and adopted as a word at the start point.

On the other hand, with respect to the end point, as processing of an answer end point output layer that is included in the machine comprehension output layer of the revised question generation model shown in FIG. 16, first, the start point vector $O_{start}$ and the machine comprehension modeling vector sequence M are input to the RNN to create a new machine comprehension modeling vector sequence M'. Subsequently, according to a similar method to the start point, a probability distribution $P_{end}$ is obtained from the new machine comprehension modeling vector sequence M' and, using the probability distribution $P_{end}$, a $t_{end}$-th element (where $t_{start} \le t_{end} \le T$) with a highest probability is extracted from the relevant document X and adopted as a word at the end point.

Accordingly, a section from the $t_{start}$-th (start point) word to the $t_{end}$-th (end point) word in the relevant document X is extracted as an answer (an answer candidate).

In order to extract N-number of answers (answer candidates), first, using $P_{start}$ and $P_{end}$, $P(i,k) = P_{start}(i) \times P_{end}(k)$ is calculated, where $0 \le i \le T$ and $i \le k \le T$. In addition, combinations of i and k that produce highest N-number of P(i,k) may be adopted as the start point and the end point. Accordingly, sections corresponding to highest N-number of combinations of i and k are respectively extracted as the N-number of answers (answer candidates).

The question answering executing unit 910 may extract the start point and the endpoint of each of the N-number of answers (answer candidates), output the N-number of answers (answer candidates) themselves, or output the word at the start point and the word at the endpoint of each of the N-number of answers (answer candidates). In the second embodiment of the present invention, it is assumed that the start point and the end point of each of the N-number of answers (answer candidates) are output. In addition, while the subsequent step S305 is to be executed with respect to each of N-number of pairs of the start point and the end point, hereinafter, the start point $t_{start}$ and the end point $t_{end}$ of a given pair will be referred to as an "answer candidate A" and step S305 will be described with respect to the answer candidate A.

Step S305: The revised question generating unit 900 generates, through steps S305-1 to S305-3 below, a revised question with respect to the answer candidate A.

Step S305-1: The question generating unit 920 of the revised question generating unit 900 inputs the answer candidate A (in other words, the start point $t_{start}$ and the end point and, as processing of the answer vector generation layer of the revised question generation model shown in FIG. 16, creates an answer vector that corresponds to the answer candidate A.

$$a \in R^{d_a} \qquad \text{[Formula 19]}$$

where $d_a$ denotes the number of dimensions of the answer vector.

As the creation method of the answer vector a, any method can be adopted as long as the answer candidate A (in other words, the start point $t_{start}$ and the end point $t_{end}$) can be used as input to create the answer vector a. For example, after temporarily converting a description of the section from the start point $t_{start}$ to the end point $t_{end}$ into a word sequence, a vector obtained by converting the word sequence with the document encode layer may be adopted as the answer vector a, or a section H $(t_{start}, t_{end}) \in R^{d \times l}$ (where l denotes a sequence length of the answer candidate A) that is determined by the start point $t_{start}$ and the end point $t_{end}$ may be extracted from a document vector sequence and the RNN may be applied, a centroid vector may be calculated, or the like with respect to a vector sequence corresponding to the extracted section to create the answer vector a.

For example, instead of adopting a description extracted as-is from the relevant document X as the answer (the answer candidate A), when using a method of generating a sentence to be the answer (the answer candidate A) based on a description in the relevant document X, the generated sentence (the sentence to be the answer) may be input and the answer vector a may be created as processing of the answer vector generation layer.

Step S305-2: As processing of the decode layer of the revised question generation model shown in FIG. 16, the question generating unit 920 of the revised question generating unit 900 creates a vector for outputting words constituting a revised question with the RNN using the answer vector a. In the RNN, as an initial value (an initial state) of a state vector, the state vectors $h_{q0}$ and $h_{M0}$ having been output from the question answering executing unit 910 are to be used.

As a method of using the state vectors $h_{q0}$ and $h_{M0}$ described above, an arbitrary method can be adopted. For example, the RNN may be divided into two layers, an initial state of the RNN of the first layer may be set to $h_{q0}$, and an initial state of the RNN of the second layer may be set to $h_{M0}$. Alternatively, for example, when using the RNN without dividing into two layers, after performing linear transformation in order to match the number of dimensions, an average vector of the two state vectors $h_{q0}$ and $h_{M0}$ may be set to an initial state or only one of the two state vectors $h_{q0}$ and $h_{M0}$ may be set to an initial state.

In addition, the state vector $h_{x0}$ of the document encode layer may be used instead of the state vector $h_{M0}$ to determine initial states of the state vectors $h_{q0}$ and $h_{x0}$ in the decode layer. Accordingly, for example, in cases where there are a plurality of different answer candidates of which P(i,k) are more or less the same (in other words, cases where a question content is ambiguous or the like), an improvement in answer accuracy can be expected.

In this case, in the Encoder-Decoder model, an embedding vector of an immediately-previously generated word is input to the decode layer.

$$e_{y_{s-1}} \in R^{d_e} \qquad \text{[Formula 20]}$$

where $d_e$ denotes the number of dimensions of the word embedding vector. By comparison, in the second embodiment of the present invention, a vector created by combining an answer vector with a word embedding vector is to be input to the decode layer.

$$[e_{y_{s-1}}; a] \in R^{(d_e + d_a)} \qquad \text{[Formula 21]}$$

The decode layer is similar to the decode layer of the Encoder-Decoder model with the exception of the initial value of the state vector and the vectors to be input. Therefore, for example, arbitrary methods used in the decode layer of the Encoder-Decoder model such as an attention mechanism (attention), copying, and the like may be applied to the decode layer of the revised question generation model shown in FIG. 16.

Step S305-3: The question generating unit 920 of the revised question generating unit 900 generates an s-th word $y_s$ that constitutes a revised question from an output of the decode layer in a similar manner to the Encoder-Decoder model. In other words, for example, after linearly transforming an output result of the decode layer, a generation probability of a word in the relevant document X is generated with a softmax function. In addition, a word with a maximum word generation probability is generated as the s-th word $y_s$. By repeating this step until <EOS> is generated as the word $y_6$, a word constituting an answer candidate that corresponds to the answer candidate A is generated. It should be noted that $y_0$ is assumed to be <BOS>.

Step S306: Finally, the output unit 1000 outputs N-number of answers (answer candidates) and N-number of revised questions RQ that respectively correspond to each of the N-number of answers.

(Learning Processing of Revised Question Generation Model)

Figure 17:
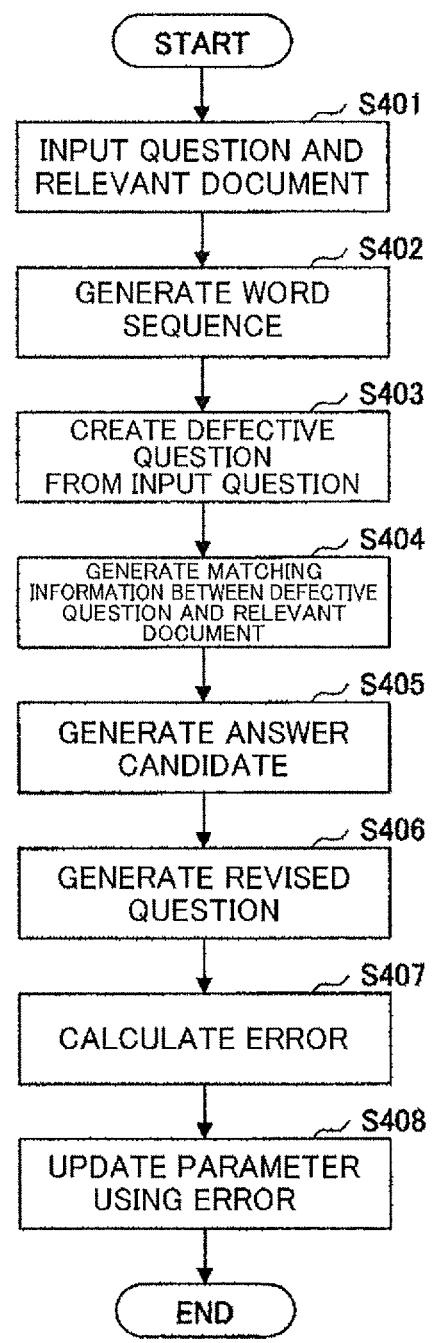
FIG. 17 is a flow chart showing an example of learning processing of the revised question generation model according to the second embodiment of the present invention.

Next, learning processing of the revised question generation model according to the second embodiment of the present invention will be described with reference to FIG. 17. FIG. 17 is a flow chart showing an example of learning processing of the revised question generation model according to the second embodiment of the present invention. In the second embodiment of the present invention, a machine comprehension corpus is to be used to learn the revised question generation model. The machine comprehension corpus includes a plurality of sets of a "question", a "document to be a question target", and an "answer range (or a character string of the answer range) in the document to be the question target". In this case, the "document to be a question target" that is included in the corpus is assumed to be the relevant document X and the "question" that is included in the corpus is assumed to be the input question Q, and the "answer range (or a character string of the answer range) in the document to be the question target" is to be used as-is as a correct answer $A_{true}$ to the input question Q. In addition, the input question Q and the correct answer $A_{true}$ to the input question Q are adopted as learning data for machine comprehension processing by the question answering executing unit 910. In the second embodiment of the present invention, it is assumed that the correct answer $A_{true}$ is represented by a pair of a start point and an end point.

Step S401: The text processing unit 800 inputs a plurality of pieces of learning data (in other words, a learning data set) and a relevant document.

Step S402: The text processing unit 800 respectively converts a plurality of input questions respectively included in the plurality of input pieces of learning data and the input relevant document into a plurality of input questions Q which are word sequences and a relevant document X. However, when using a machine comprehension corpus, since the plurality of input questions and the input relevant document are often already expressed as word sequences, step S402 need not be performed.

For example, the learning processing of the revised question generation model involves dividing a learning data set into a prescribed number of mini-batches and subsequently updating a parameter of the revised question generation model for each mini-batch.

Steps S403 to S406 below are repetitively executed using each piece of learning data that is included in the mini-batch. On the other hand, steps S407 to S409 below are executed after steps S401 to S206 are executed with respect to all of the pieces of learning data included in the mini-batch.

Step S403: The defective question creating unit 300 creates a question Q (a defective question Q) by omitting a part of the input question Q that is learning data. Since the input question Q constitutes correct-answer data with respect to the defective question Q, hereinafter, the input question Q will be referred to as a correct-answer question $Q_{true}$.

In this case, as a method of creating the defective question Q, an arbitrary method can be adopted. For example, the defective question Q may be statistically created using a learned Encoder-Decoder model or the defective question Q may be made using syntactic information such as dependency of a sentence and omitting a clause or a phrase. Alternatively, the defective question Q may be created using a method of sentence compression that is a task of natural language processing.

Step S404: The question answering executing unit 910 of the revised question generation model learning unit 1100 generates matching information. Since step S404 is similar to step S303 in FIG. 15 with the exception of the input question Q in step S303 being replaced with the defective question Q, a description thereof will be omitted.

Step S405: The question answering executing unit 910 of the revised question generation model learning unit 1100 generates answer candidates with respect to the defective question Q. Since step S405 is similar to step S304 in FIG. 15 with the exception of the input question Q in step S304 being replaced with the defective question Q, a description thereof will be omitted.

Step S406: The question generating unit 920 of the revised question generation model learning unit 1100 generates the revised question RQ that corresponds to each of the answer candidates of the defective question Q. Since step S406 is similar to step S305 in FIG. 15 with the exception of the input question Q in step S305 being replaced with the defective question Q, a description thereof will be omitted.

Step S407: The parameter updating unit 1110 of the revised question generation model learning unit 1100 calculates a first error between the revised questions RQ respectively generated using each piece of learning data included in the mini-batch and the input question Q (in other words, the correct-answer question $Q_{true}$) that is included in the learning data. In addition, the parameter updating unit 1110 calculates a second error between an answer A with respect to the input question Q that is respectively included in each piece of learning data included in the mini-batch and a correct answer $A_{true}$ that is included in the learning data. In this case, the answer A is obtained as an answer in question answering by inputting the input question Q (and the relevant document X) to the question answering executing unit 910.

As an error function to be used in the calculation of the first error and the second error, for example, cross entropy may be used. The error function is to be appropriately determined in accordance with the revised question generation model.

Step S408: Using the first error and the second error calculated in step S407 described above, the parameter updating unit 1110 of the revised question generation model learning unit 1100 updates the parameter of the revised question generation model. Specifically, for example, using the first error and the second error calculated in step S407 described above, the parameter updating unit 410 updates the parameter of the revised question generation model by calculating a partial differential value of the error function according to back propagation. Accordingly, the revised question generation model is learned.

When the revised question generation model is a neural network such as that shown in FIG. 16, an error function related to correct-answer data (in other words, the correct-answer question $Q_{true}$ with respect to the revised question RQ and the correct answer $A_{true}$ with respect to the correct-answer question $Q_{true}$) is defined for each of machine comprehension (in other words, the question answering executing unit 910) and revised question generation (in other words, the question generating unit 920), a sum of error function values (in other words, a sum of the first error and the second error) is handled as an error of the entire neural network, and the parameter is updated (in other words, the parameter is updated by multitask learning) so as to reduce the error.

(Summary)

As described above, using a revised question generation model that is realized by, for example, a neural network, the question generation device 100 according to the second embodiment of the present invention performs question answering with respect to an input question Q prior to generating a revised question RQ, and generates revised questions RQ that correspond to answer candidates obtained by the question answering. Accordingly, for example, even when an answer to the input question Q cannot be uniquely specified, since the revised question RQ is generated for each answer candidate, using the revised questions RQ in a question answering task enables high answer accuracy to be realized.

The present invention is not limited to the respective embodiments described above that have been disclosed with specificity, and various modifications and changes may be made without departing from the scope of the appended claims.

REFERENCE SIGNS LIST

100 Question generation device
200 Revised question generating unit
210 Collating unit
220 Question restoring unit
300 Defective question creating unit
400 Revised question generation model learning unit

The invention claimed is:

1. A question generation device, comprising:
a processor; and
a memory storing program instructions that cause the processor to:
   use a first query and a relevant document including an answer to the first query as input to generate a partially omitted query by
      performing at least one of i) a syntax analysis such as a dependency analysis, ii) a phrase structure analysis of the query, or iii) a pattern matching based on a predetermined marker to determine a part to be omitted from the first query,
      setting a granularity of the part to be omitted from the first query, and
      omitting a part of the first query,
   use a neural network model to generate a restored query by restoring the partially omitted query using a word included in a prescribed lexical set, and use an error between the restored query and the query to update a parameter of the neural network model, and
   use a second query and the relevant document including an answer to the second query as input and, using the neural network model having been learned in advance, generate a revised query in which a potentially omitted portion of the second query is supplemented with a word included in the prescribed lexical set.

2. The question generation device according to claim 1, wherein the processor generates matching information representing a matching relationship between each word included in the second query and each word included in the relevant document, and generates the revised query by using the matching information to generate each word that constitutes the revised query from within the lexical set.

3. The question generation device according to claim 2, wherein the processor generates each word that constitutes the revised query according to a third probability that is represented by a weighted average of a first probability with which the word is generated from words included in the lexical set and a second probability with which the word is generated from words included in the relevant document.

4. The question generation device according to claim 1, wherein the revised query is a sentence in which a potentially defective portion of the second query is complemented by a word included in the lexical set and a word included in the relevant document.

5. The question generation device according to claim 1, wherein the processor generates, when the second query is input, based on the second query and a set of relevant documents that include an answer to the second query, the revised query that corresponds to each of the relevant documents included in the set and correspondence information between the relevant document and the revised query.

6. The question generation device according to claim 1, wherein the processor repetitively executes using the revised query as input and generating a further revised query in which a potentially omitted portion of the revised query is complemented.

7. The question generation device according to claim 1, wherein the processor generates an answer candidate with respect to the query and the revised query of which an answer corresponds to the answer candidate.

8. The question generation device according to claim 7, wherein the processor generates matching information representing a matching relationship between each word included in the query and each word included in the relevant document, uses the matching information to generate the answer candidate, and generates the revised query by using the answer candidate and the matching information to generate each word that constitutes the revised query from within the lexical set.

9. A question generation device, comprising:
a processor; and
a memory storing program instructions that cause the processor to
use a query and a relevant document including an answer to the query as input to generate a partially omitted query by:
   performing at least one of i) a syntax analysis such as a dependency analysis, ii) a phrase structure analysis of the query, or iii) a pattern matching based on a predetermined marker to determine a part to be omitted from the query,
   setting a granularity of the part to be omitted from the query, and
   omitting a part of the query,
use a neural network model to generate a restored query by restoring the partially omitted query using a word included in a prescribed lexical set, and
use a difference between the restored query and the query to update a parameter of the neural network model.

10. The question generation device according to claim 9, wherein the processor further uses an error between a correct answer to the second query and an answer to the second query to update a parameter of the neural network model.

11. A question generation method performed by a computer, the method comprising:
using a first query and a relevant document including an answer to the first query as input to generate a partially omitted query by:
   performing at least one of i) a syntax analysis such as a dependency analysis, ii) a phrase structure analysis of the query, or iii) a pattern matching based on a predetermined marker to determine a part to be omitted from the first query,
   setting a granularity of the part to be omitted from the first query, and
   omitting a part of the first query,
using a neural network model to generate a restored query by restoring the partially omitted query using a word included in a prescribed lexical set, and using an error between the restored query and the query to update a parameter of the neural network model, and
using a second query and the relevant document including an answer to the second query as input and, using the neural network model having been learned in advance, generating a revised query in which a potentially defective portion of the second query is supplemented with a word included in a prescribed lexical set.

12. A non-transitory computer-readable recording medium having stored therein the program instructions for causing the processor to function as the question generation device according to claim 1.

* * * * *